United States Patent [19]

Ishikawa et al.

[11] Patent Number: 5,195,077
[45] Date of Patent: Mar. 16, 1993

[54] DISC LOADING MECHANISM FOR LARGE AND SMALL DISKS

[75] Inventors: Hideyo Ishikawa; Hidenori Muramatsu; Kazuki Takai, all of Toda, Japan

[73] Assignee: Clarion Co., Ltd., Tokyo, Japan

[21] Appl. No.: 648,579

[22] Filed: Jan. 30, 1991

[30] Foreign Application Priority Data

Jan. 31, 1990 [JP] Japan .................................. 2-18952
Mar. 23, 1990 [JP] Japan .................................. 2-71951

[51] Int. Cl.$^5$ .......................... G11B 33/02; G11B 3/00
[52] U.S. Cl. ................................. 369/75.2; 369/176; 369/191
[58] Field of Search .............. 369/75.1, 75.2, 77.1, 369/77.2, 191, 194, 176, 292

[56] References Cited

U.S. PATENT DOCUMENTS

| 4,498,162 | 2/1985 | Schatteman | 369/77.1 |
| 4,523,306 | 6/1985 | Staar | 369/77.1 |
| 4,641,298 | 2/1987 | Ikeda et al. | 369/77.1 |
| 4,839,889 | 6/1989 | d'Alayer de Costenore | 369/75.2 |
| 4,969,140 | 11/1990 | Koiwa et al. | 369/77.1 |
| 5,010,428 | 4/1991 | d'Alayer de Costenore | 369/75.2 |
| 5,010,484 | 4/1991 | Kobayashi et al. | 369/75.2 |
| 5,022,023 | 6/1991 | Toyoguchi | 369/77.1 |
| 5,038,337 | 8/1991 | Muramatsu et al. | 369/77.1 |

Primary Examiner—Eugene R. LaRoche
Assistant Examiner—Michael C. Kessell
Attorney, Agent, or Firm—Price, Gess & Ubell

[57] ABSTRACT

A disc loading structure capable of automatically and positively loading a disc in a disc apparatus with a simple structure irrespective of the size of the disc and carrying out a substantial decrease in power consumption in use and manufacturing costs. A mechanical sensor link is pivotally arranged so as to be pivotally moved due to engagement with a disc and a lock member is pivotally arranged and selectively engaged with the sensor link so as to be pivotally movable in association with the pivotal movement thereof. The lock member selectively serves to lock a stopper arm at a small-diameter disc position depending upon the position of the sensor link pivotally moved. Also, the structure includes a large-diameter disc regulator for holding the stopper arm at a large-diameter disc position.

4 Claims, 23 Drawing Sheets

F I G. 7D
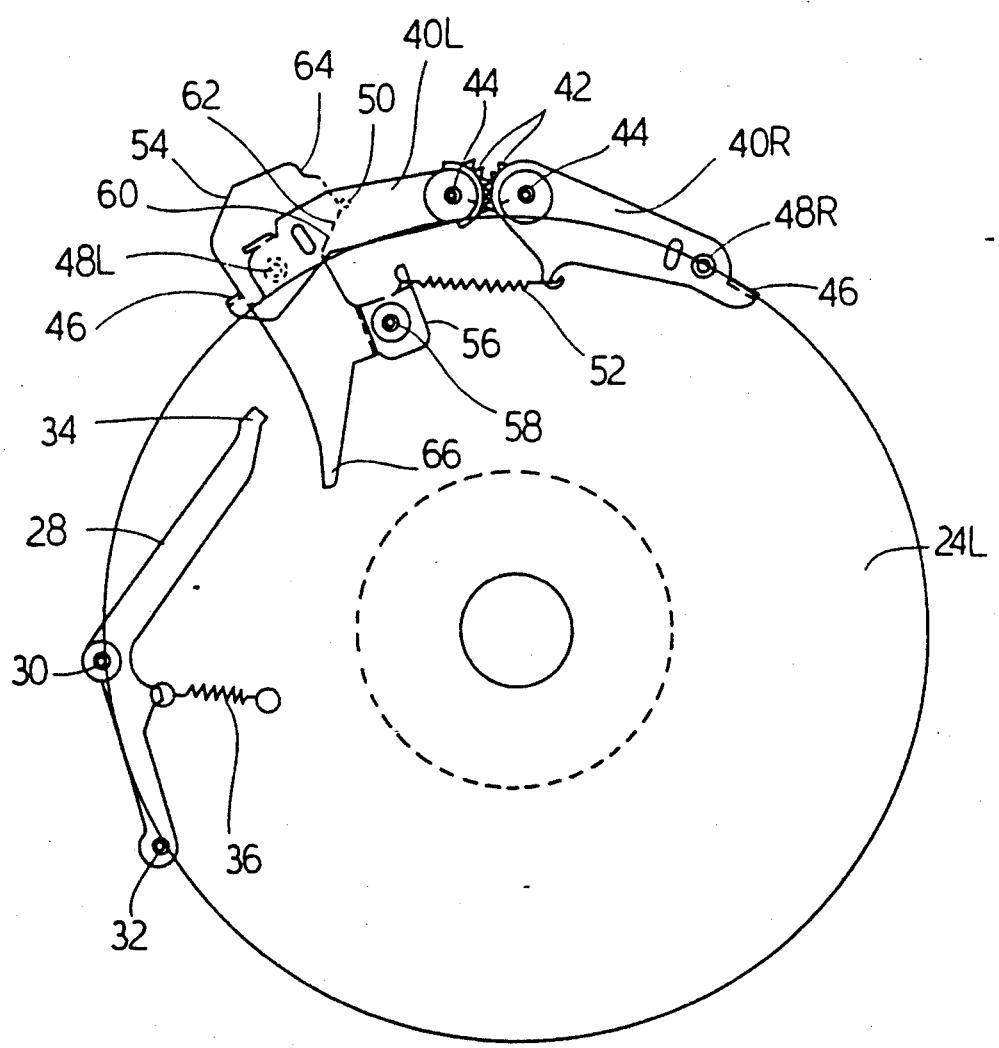

F I G. 14
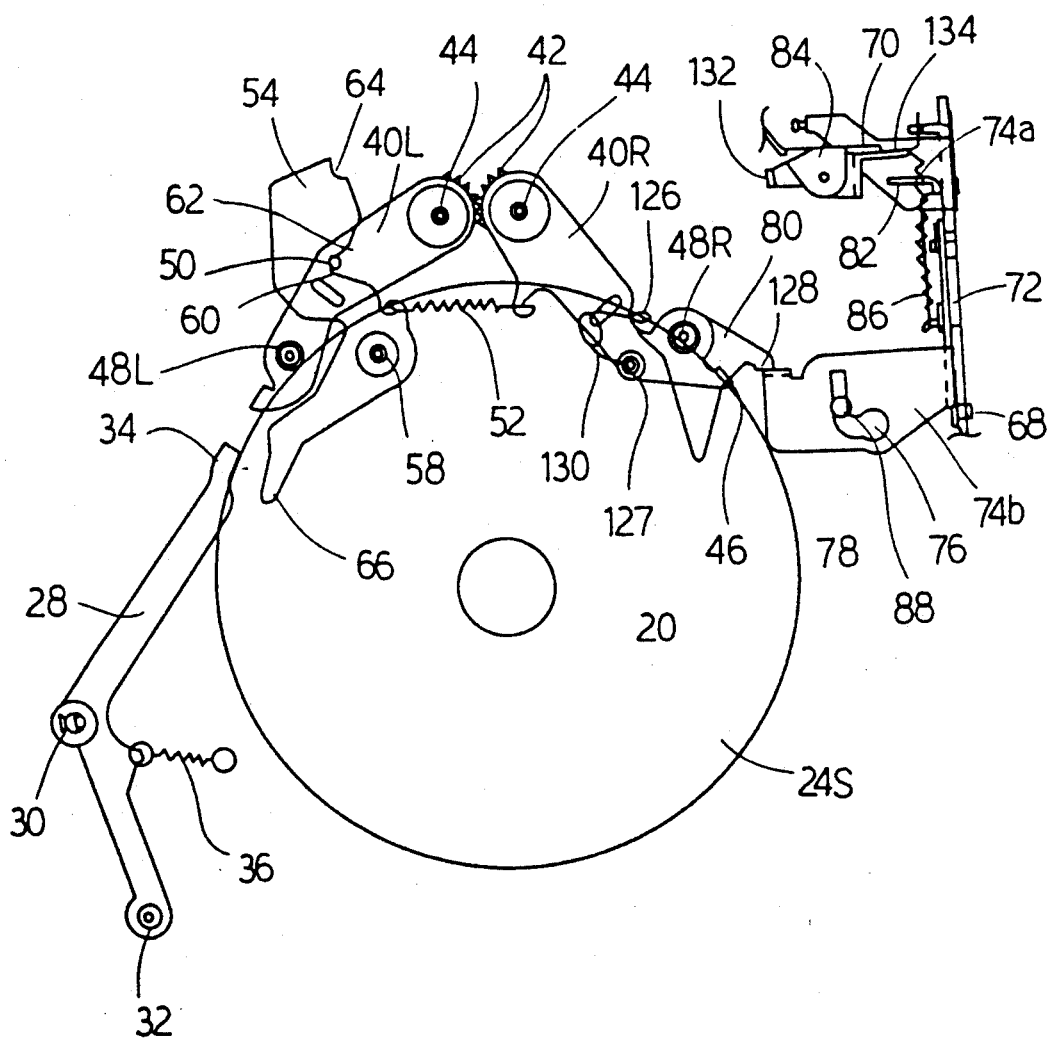

DISC LOADING MECHANISM FOR LARGE AND SMALL DISKS

BACKGROUND OF THE INVENTION

This invention relates to a disc loading structure for a disc apparatus such as a compact disc player or the like, and more particularly to a disc loading structure for loading a disc such as a compact disc or the like onto a turntable of the disc apparatus.

Recently, the demand on a compact disc (CD) by consumers is highly diversified with rapid spread of the compact disc, leading to the manufacturing and selling of a compact disc of a diameter as small as 8 cm (hereinafter referred to as "8 cm compact disc"), in addition to an existing compact disc of 12 cm in diameter (hereinafter referred to as "12 cm compact disc"). This causes a compact disc player to be required not only to be simplified in construction and exhibit satisfactory operability but to be equally accommodated to both compact discs.

In general, a compact disc player includes a disc loading mechanism for automatically transferring a compact disc to place it on a turntable. Unfortunately, a conventional disc loading mechanism is not constructed so as to be accommodated to a 12 cm compact disc. This causes the playing-back of an 8 cm compact disc to require to use an exclusive adapter, resulting in the operability being highly deteriorated.

In view of the foregoing, the assignee proposed a disc loading mechanism for handling two or more compact discs different in size without using any adapter. The disc loading mechanism is adapted to automatically position a compact disc on a turntable depending upon the size of the compact disc. More particularly, the proposed disc loading mechanism, as shown in FIG. 1, includes a detection sensor group 200 for discriminating the size of a compact disc to be loaded, a solenoid 202, a pair of stopper arms 204, and pivotal-movement regulating plates 206 each for positionally regulating the position of each of the stopper arms 204. The detection sensors of the detection sensor group 200, as shown in FIG. 2, each includes a light emitter 208 and a light receptor 210, which are arranged forward of a disc transfer means 212 so as to correspond to the size of a compact disc. The detection sensors each exhibits a detection mode when a compact disc being transferred overlaps the detection sensor to intercept light emitted from the light emitter 208 toward the light receptor 210. When the sensor group 200 judges predetermined patterns of detection modes of the detection sensors to discriminate the size of the compact disc being transferred toward a turntable 214.

The solenoid 202 is arranged to engage with one of the pivotal-movement regulating plates 206. When the detection sensor group 200 discriminates that a compact disc being transferred or inserted into a disc player is an 8 cm compact disc, the solenoid 202 is energized. This causes the pivotal-movement regulating plate 206 to be restrained, so that the stopper arms 204 are held at an 8 cm compact disc position. Whereas, when the discriminating means or detection sensor group 200 judges that the compact disc is a 12 cm compact disc, the solenoid 202 is de-energized, so that the pivotal-movement regulating plates 206 and stopper arms 204 may be movable. Then, the movement of the compact disc being transferred causes the stopper arms 204 to be moved to and held at a 12 cm compact disc position.

Also, in the conventional disc loading mechanism described above, the detection sensor group detects the completion of insertion of a compact disc into a disc player when the compact disc is positioned on a predetermined position above the turntable. This causes the rotation of the transfer roller 212 to be stopped and the disc to be clamped.

Unfortunately, the conventional disc loading mechanism is substantially increased in manufacturing costs because the detection sensor group constituting the discriminating means and the solenoid are highly expensive. Also, the conventional disc loading mechanism requires a lot of detection sensors for electrically detecting a compact disc, resulting in being complicated in structure and increased in power consumption. In particular, when the disc player is used in a manner to be mounted on a vehicle such as a car, such an increase in power consumption has a possibility of causing a battery used as a power supply for the vehicle to be dead.

Such disadvantages as described above are likewise encountered with a disc player other than the compact disc player, such as a laser disc player which is adapted to handle a plurality of laser discs different in size.

SUMMARY OF THE INVENTION

The present invention has been made in view of the foregoing disadvantages of the prior art.

It is an object of the present invention to provide a disc loading structure which is capable of automatically and positively loading a disc in a disc apparatus with a simple structure irrespective of the size of the disc.

It is another object of the present invention to provide a disc loading structure which is capable of automatically positioning each of discs different in size on a turntable through a simply constructed mechanical means irrespective of the size of a disc to be charged.

It is a further object of the present invention to provide a disc loading structure which is capable of carrying out a substantial decrease in power consumption in use and manufacturing costs.

It is still another object of the present invention to provide a disc loading structure which is capable of mechanically detecting the completion of insertion of a disc into a predetermined position to carry out the transmission of power required for the clamping of the disc, irrespective of the size of the disc.

It is yet another object of the present invention to provide a power transmission mechanism for a disc loading structure which is capable of mechanically accurately detecting the completion of insertion of a disc into a predetermined position to carry out the transmission of power required for the clamping of the disc, irrespective of the size of the disc.

It is a still further object of the present invention to provide a power transmission mechanism for a disc loading structure which is capable of accurately transmitting power required to clamp a disc upon the completion of insertion of the disc, irrespective of the size of the disc.

It is a yet further object of the present invention to provide a power transmission mechanism for a disc loading structure which is capable of accomplishing a significant decrease in power consumption and manufacturing costs.

In accordance with one aspect of the present invention, a disc loading structure is provided. The disc loading structure a mechanical disc discriminating means pivotally arranged so as to be pivotally moved due to engagement with a disc, a stopper arm means pivotally arranged and including a stopper against which a disc is abutted and a lock member pivotally arranged and selectively engaged with the mechanical disc discriminating means so as to be pivotally movable in association with the pivotal movement of the mechanical disc discriminating means. The lock member is adapted to selectively lock the stopper arm means at any one of two or more predetermined positions depending upon the position of the mechanical disc discriminating means pivotally moved due to the engagement.

In accordance with another aspect of the present invention, a power transmission mechanism for a disc structure is provided which is adapted to detect the completion of insertion of each of two or more discs different in size to a predetermined position to transmit power required to clamp the disc at the position. The power transmission mechanism a stopper arm means including a stopper against which the disc is abutted and pivotally arranged so as to hold the disc at the predetermined position, a small-diameter disc detection plate pivotally provided at the stopper arm means, a large-diameter disc detection plate pivotally arranged so as to be pivotally moved by the stopper arm means, a trigger plate movably arranged so as to be forcedly moved by the small-diameter disc detection plate or large-diameter detection plate depending upon the insertion of the disc to the predetermined position, an intermittent gear arranged so as to be rotated due to the movement of the trigger plate, a drive gear engaged with the intermittent gear for driving the intermittent gear, and a rack plate engaged with the intermittent gear so that the drive force of the drive gear is transmitted thereto through the intermittent gear.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIGS. 7A to 7E each are a plan view showing the manner of loading of a 12 cm compact disc;

FIGS. 13 and 14 each are a plan view showing the manner of loading of an 8 cm compact disc;

DETAILED DESCRIPTION OF THE PREFERRED EMBODIMENTS

Now, a disc loading structure according to the present invention will be described hereinafter with reference to FIGS. 3 to 17, FIGS. 3 to 5 show an embodiment of a disc loading structure according to the present invention, which is applied to a compact disc player including a turntable 20 arranged at substantially the central portion thereof.

A disc loading mechanism of the illustrated embodiment includes a drive or transfer roller 22 arranged rearward of the turntable 20 to transfer a compact disc 24. A position and/or a direction relating to the words of "rear", "rear side", "rearward" and the like used herein in connection with the disc loading structure and components thereof are defined on the basis of a direction to which a disc is discharged or ejected from the disc loading mechanism and those relating to the words of "front", "front side", "forward" and the like are defined on the basis of a direction in which the disc is advanced during the operation of loading a disc in the disc loading structure. Therefore, relatively, the words "rear", "rear side" and "rearward" indicate the side of a disc insertion port of the disc loading structure, whereas the words "front", "front side" and "forward" indicate the depth side of the structure.

Figure 1:
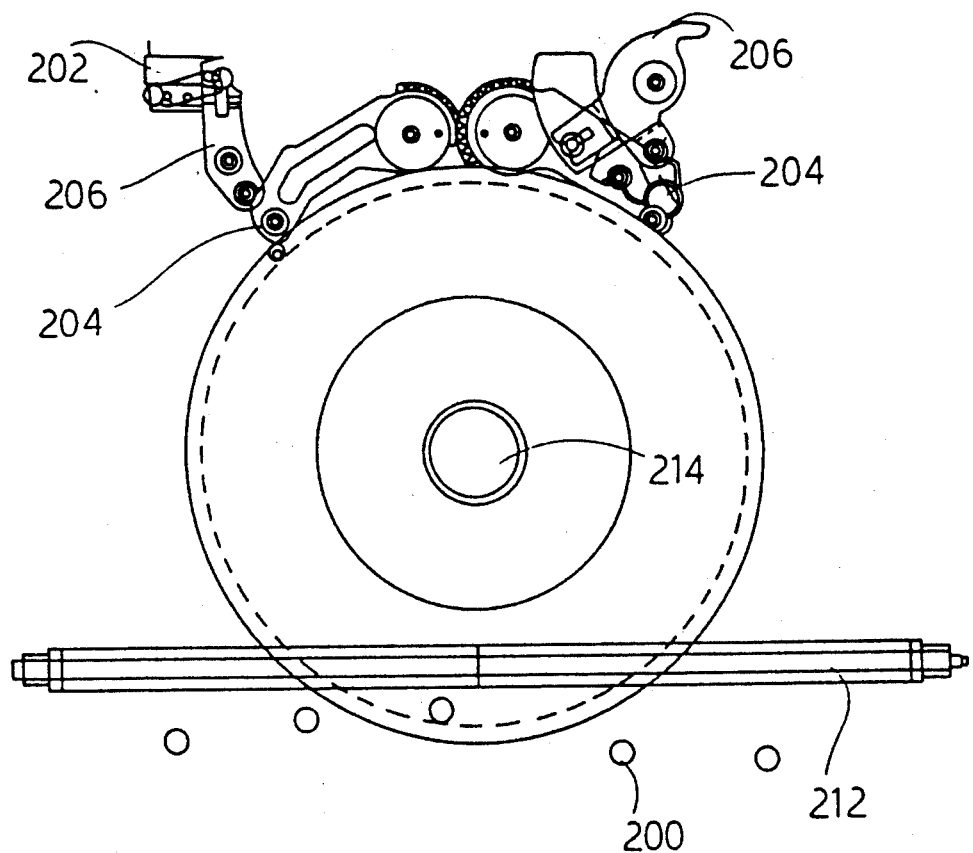
FIG. 1 is a plan view showing a conventional disc loading structure.
Figure 2:
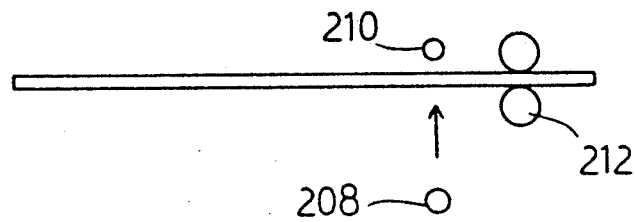
FIG. 2 is a fragmentary schematic plan view showing the arrangement of a photosensor and a transfer roller in the conventional disc loading structure of FIG. 1.
Figure 3:
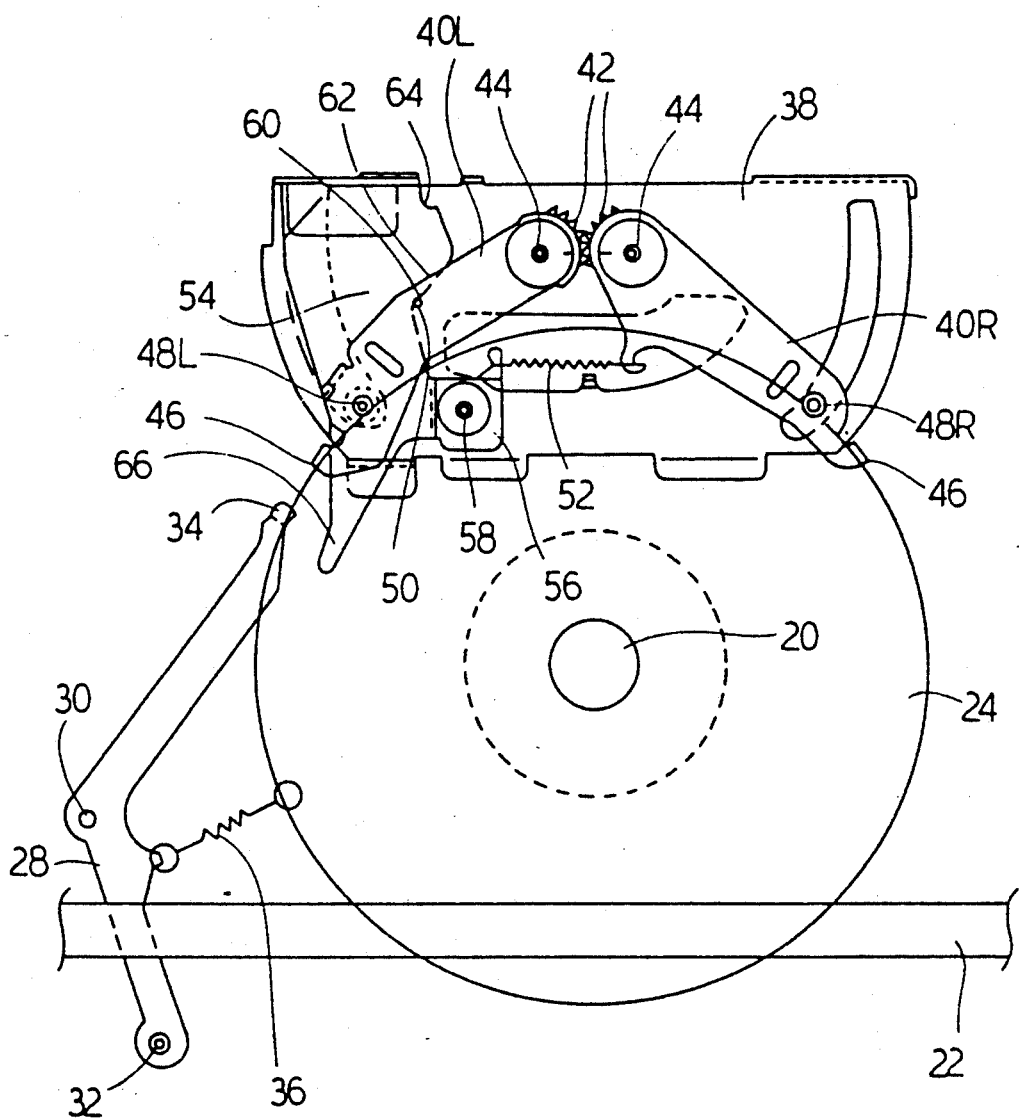
FIG. 3 is a plan view showing an embodiment of a disc loading structure according to the present invention.
Figure 4:
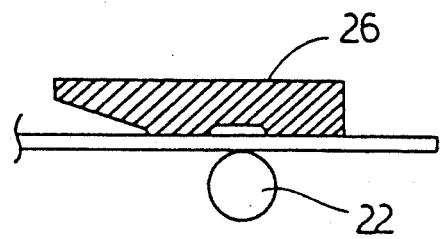
FIG. 4 is a fragmentary sectional side elevation view showing an essential part of the disc loading structure shown in FIG. 3.
Figure 5:
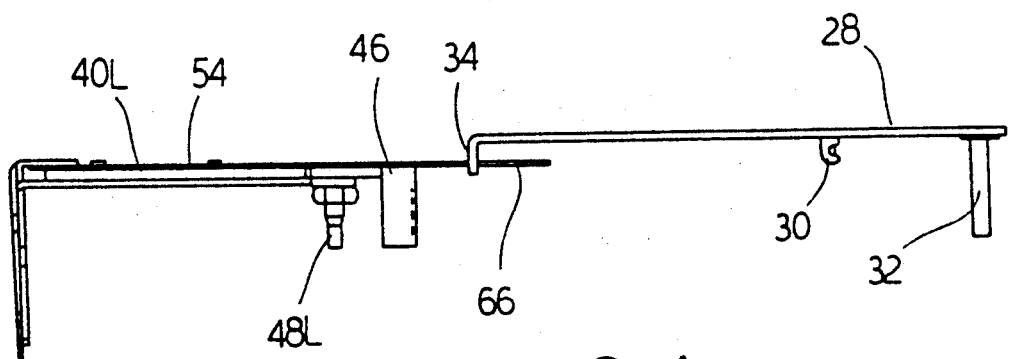
FIG. 5 is a fragmentary side elevation view showing another essential part of the disc loading structure shown in FIG. 3.

Above the transfer roller 22, as shown in FIG. 4, is arranged an upper disc guide 26, which is adapted to guide the transfer of the compact disc 24 by means of the transfer roller 22 while contacting with the upper surface of the disc 24. Also, the disc loading structure, as shown in FIG. 3, includes a mechanical disc discriminating means, which comprises a mechanical sensor link arm 28 arranged on one side at the front of the transfer roller 22 in a manner to be pivotally movable. The sensor link 28 is formed into an outward projecting dog-leg shape, of which the bent portion is supported on a support shaft 30 about which the sensor link 28 is pivotally movable. The sensor link 28 is so arranged that its rear end is positioned between the transfer roller 22 and a disc insertion port (not shown) of the disc loading structure. Also, the rear end of the sensor link 28, as shown in FIG. 5, is provided with an downward extending pin 32. The sensor link 28 has a front end downward bent to form a pawl 34. Further, the sensor link 28 is connected at the portion in proximity to the support shaft 30 to a sensor link spring 36, which acts to constantly urge the sensor link 28 in a counterclockwise direction, to thereby cause the sensor pin 32 to be abutted against the outer periphery or edge of the compact disc 24 being transferred.

The disc loading structure also includes a stage plate 38 arranged in front of the turntable 20, as shown in FIG. 3. On both sides of the stage plate 38 are arranged a pair of stopper arms 40L and 40R, of which the proximal ends are connected to each other through gears 42 provided thereon and pivotally supported on support shafts 44, so that both stopper arms may be pivotally movable at the respective proximal ends thereof about the support shafts 44 in a symmetric manner. The stopper arms 40L and 40R are formed at the distal ends thereof with abutments 46 and provided at the distal or intermediate portions thereof with stopper pins 48L and 48R. The abutment 46 is adapted to be abutted on the inner side thereof against the outer periphery of the compact disc 24 being transferred and on the outer side thereof against the surface of the front wall of the stage plate 38. Likewise, the stopper pins 48L and 48R each are adapted to be abutted against the outer periphery of the compact disc 24. The left-side stopper arm 40L is provided at the central portion thereof with an engagement pin 50 in a manner to downward extend, whereas the right-side stopper arm 40R is connected to one end of a lock arm spring 52, which serves to constantly urge the stopper arm 40R so as to cause both stopper arms 40L and 40R to approach each other.

Further, the disc loading structure of the illustrated embodiment includes a lock arm 54 pivotally arranged on the stage plate 38 in a manner to be in proximity to one of the stopper arms 40L and 40R. In the illustrated embodiment, the lock arm 54 is positioned in the vicinity of the left-side stopper arm 40L. The lock arm 54, as shown in FIG. 3, comprises a deformed plate configured into a shape like a tobacco pipe and is so arranged that the portion thereof corresponding to a mouthpiece of a tobacco pipe is positioned on the rear side. The lock arm 54 is provided at the rear portion of the right-side periphery thereof with a projection 56, which is pivotally mounted on a support shaft 58. This results in the lock arm 54 being pivotally moved at the projection 56 about the support shaft 58. Also, the lock arm 54 is provided at the central portion of the inner or right-side periphery or edge thereof with a rear lock 60 and a guide 62 contiguous to the rear lock 60 in the front direction. In the illustrated embodiment, the rear lock 60 comprises a depression such as a recess or cutout formed on the right-side periphery or edge of the lock arm 54 and the guide 62 comprises a slope formed on the right-side edge of the lock arm so as to outward obliquely extend from the recess 60. Further, the lock arm 54 is provided at the front portion of the inner or right-side periphery or edge thereof with a front lock 64, which, in the illustrated embodiment, comprises a depression such as a recess or cutout formed on the right-side edge of the lock arm 54. The rear and front locks 60 and 64 each are adapted to be abuttedly engaged with the engagement pin 50 of the stopper arm 40L and the guide 62 is adapted to guide the engagement pin 50 therealong while keeping the pin contacted therewith. In the illustrated embodiment, the front lock 64 constitutes a means for regulating a compact disc of a large diameter.

The lock arm 54 is provided at the rear end thereof with a pawl 66 against which the pawl 34 of the mechanical sensor link 28 is engagedly abutted. The lock arm 54 is connected through the projection 56 to the other end of the lock arm spring 52 so that it elastically urges the lock arm 54 to cause the arm to be pivotally moved in a clockwise direction. Also, this results in the lock arm 54 being operatively connected to the stopper arm 40R through the spring 52.

The stopper arm 40L is positionally regulated or held when the engagement pin 50 of the stopper arm 40L is kept abutted against the rear lock 60. This results in the stopper arm 40R operatively connected to the stopper arm 40L through the gears 42 being likewise positionally regulated. A position defined by the stopper pins 48L and 48R of the stopper arms 40L and 40R thus positionally regulated corresponds to an 8 cm compact disc position. Then, the stopper arms 40L and 40R are pivotally moved in the forward direction to cause the abutments 46 to be abutted against the front wall of the stage plate 38. This causes the engagement pin 50 of the stopper arm 40L to be abutted against the front lock 64 of the lock arm 54, so that the stopper arm 40L is positionally regulated, resulting in the stopper arm 40R operatively connected through the gears 62 to the stopper arm 40L being also positionally regulated. A position defined by the stopper pins 48L and 48R of the stopper arms 40L and 40R thus positionally regulated corresponds to a 12 cm compact disc position.

The vertical positional relationship among the stopper arm 40L, lock arm 54 and sensor link 28, as shown in FIG. 5, is so defined that the sensor link 28, lock arm 54 and stopper arm 40L are arranged in order in the downward direction with predetermined vertical intervals being defined therebetween so as to ensure their smooth pivotal movement.

Now, the manner of operation of the disc loading structure of the illustrated embodiment will be described hereinafter with reference to FIGS. 6A to 8E.

First, the manner of loading of an 8 cm compact disc will be described with reference to FIGS. 6A to 6E.

When the insertion of an 8 cm compact disc 24S in the disc loading structure is started, a motor starting sensor (not shown) arranged forward of the disc insertion port of the structure detects the starting of insertion of the disc. This causes a loading start command to be generated, resulting in the transfer roller 22 being rotated. Then, an operator pushes the compact disc 24S to a position at which the disc is interposedly held between the transfer roller 22 and the upper disc guide 26, the transfer roller 22 being rotated transfers the disc 24S in the forward direction. The disc insertion port is preferably formed into a width somewhat larger than the diameter of a 12 cm compact disc so that the 12 cm disc may be smoothly inserted therethrough. Such configuration of the disc insertion port often causes the 8 cm disc to be inserted therethrough while being deviated from the center of the port. However, the disc loading structure of the illustrated embodiment ensures smooth insertion of the 8 cm disc irrespective of such deviation or displacement of the disc.

Figure 6A:
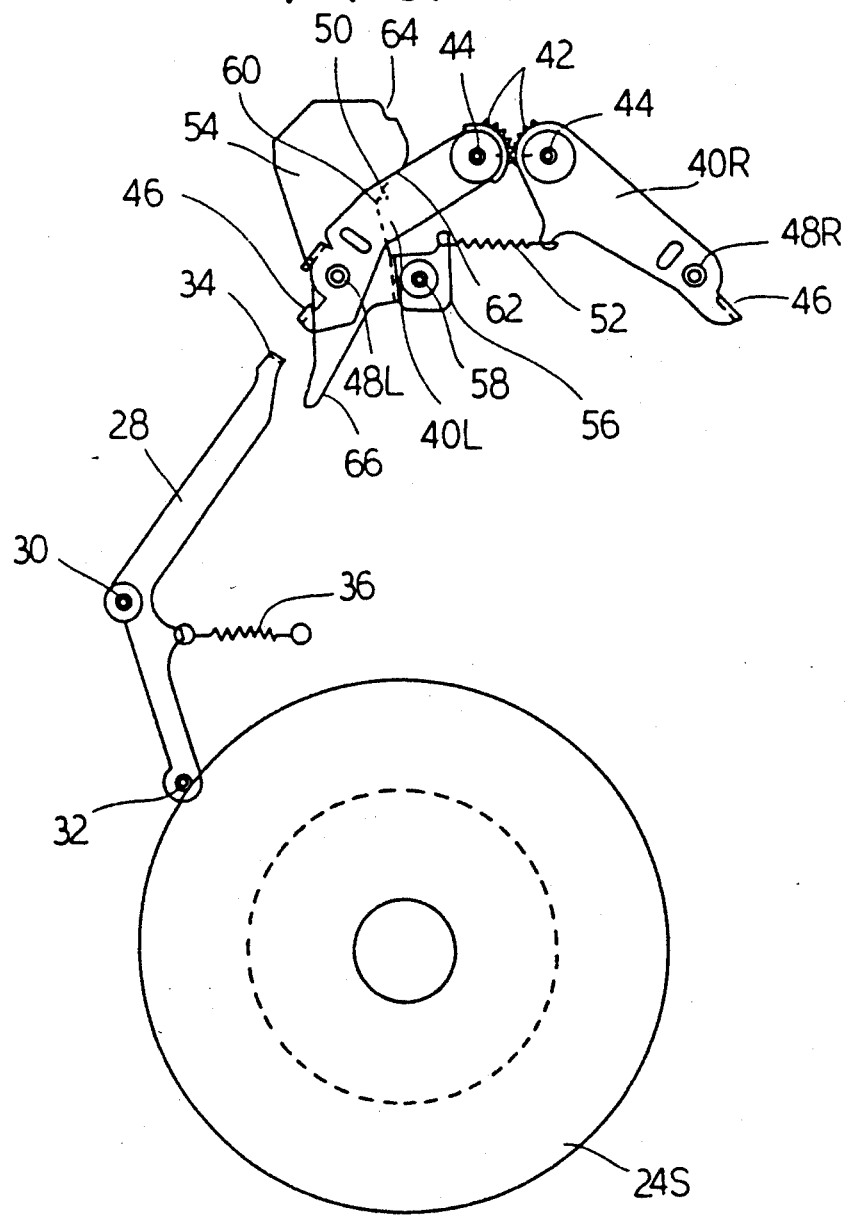
FIGS. 6A to 6E each are a plan view showing the manner of loading of an 8 cm compact disc.
Figure 6B:
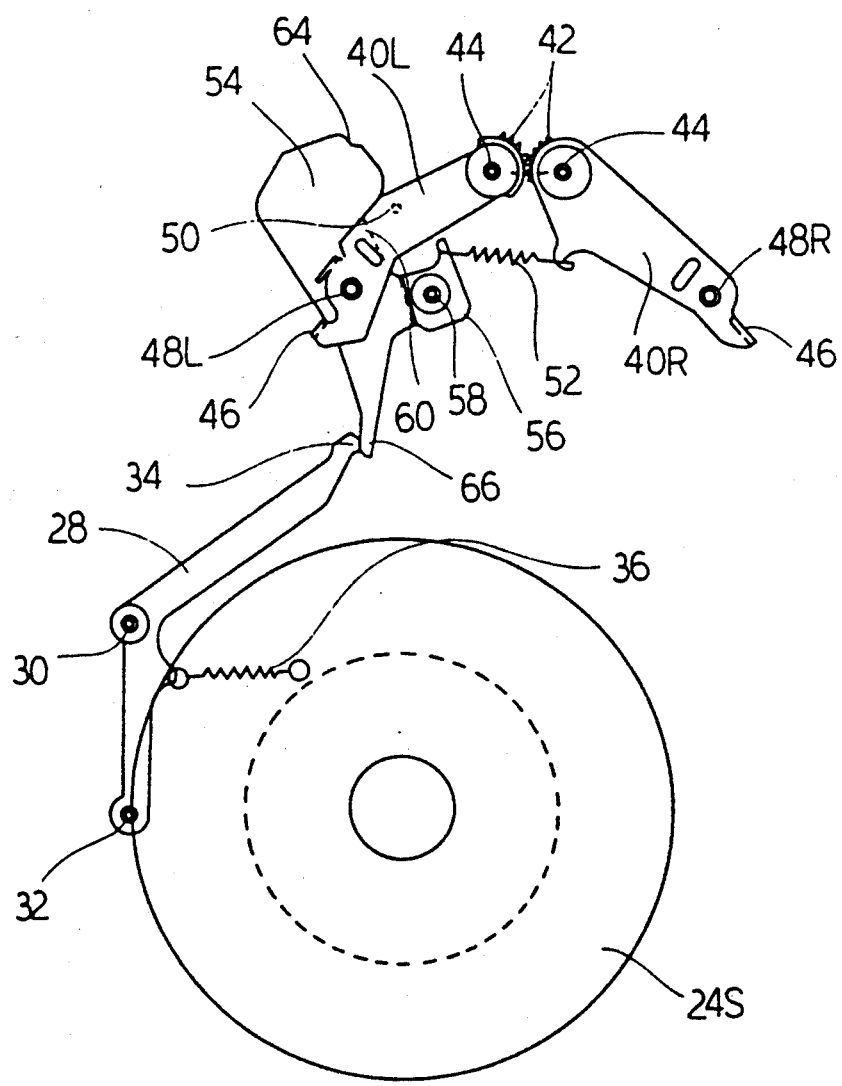
Figure 6C:
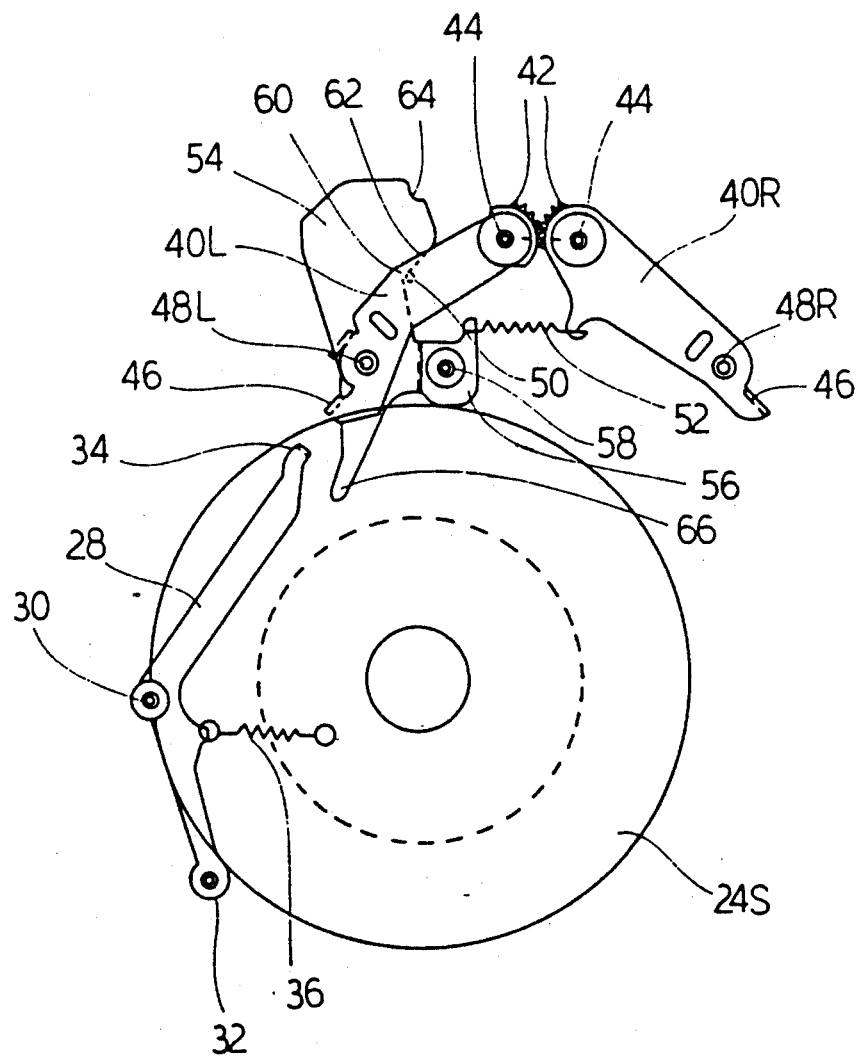
Figure 6D:
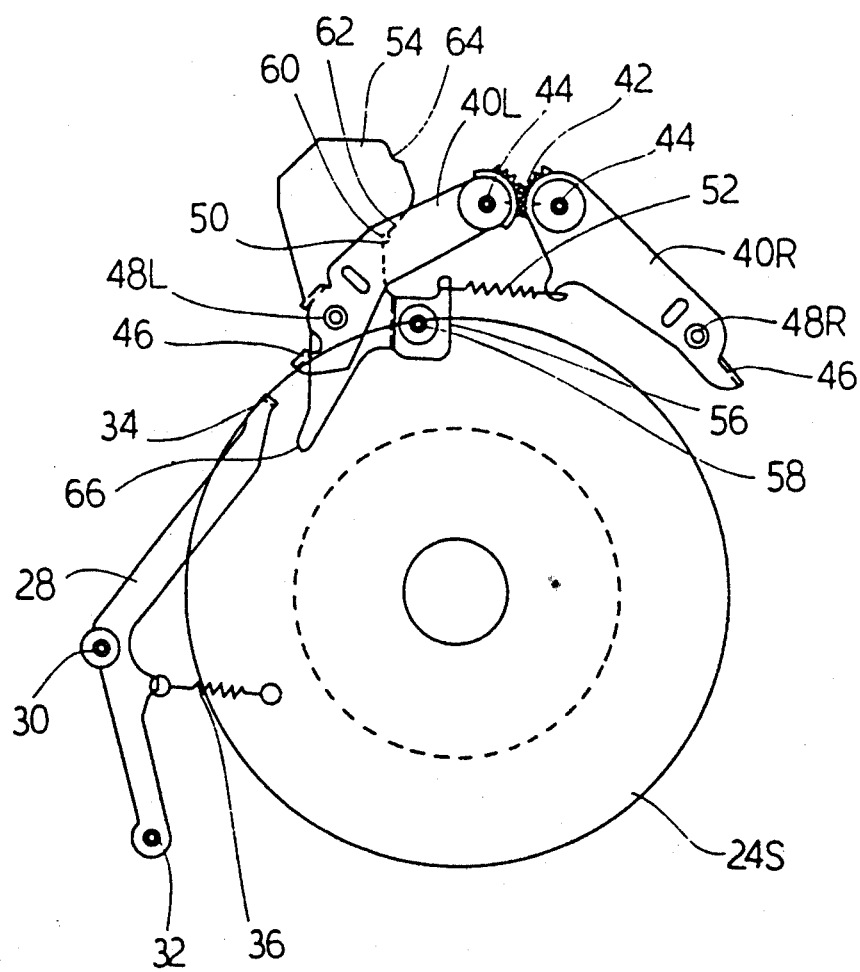

More particularly, when the insertion of the 8 cm compact disc 24S is started while being deviated in the left direction as shown in FIG. 6A, the disc 24S is abutted against the sensor pin 32. Then, when the disc is advanced or forward moved, the sensor link 28 is pivotally moved in the clockwise direction about the support shaft 30. At this time, as shown in FIG. 6B, the pawl 34 of the sensor link 28 is abutted against the pawl 66 of the lock arm 54 to force the lock arm, to thereby cause it to be pivotally moved in the counterclockwise direction. Such pivotal movement of the lock arm 54 causes the engagement pin 50 to be released from the rear lock 60, so that the locking of the stopper arm 40L is released. Further advance of the 8 cm compact disc 24S causes the elastic force of the sensor link spring 36 to act on the sensor link 28 to cause it to be pivotally moved in the counterclockwise direction along the periphery of the 8 cm compact disc 24S. This results in the lock arm 54 being pivotally moved in the clockwise direction to the original position due to the elastic force of the lock arm spring 52, so that the rear lock 60 is abutted against the engagement pin 50 to regulate pivotal movement of the stopper arm 40L. Then, the 8 cm compact disc 24S is abutted against the abutment 46 and stopper pin 48L of the stopper arm 40L. At this time, the lock arm 54 regulates the pivotal movement of the stopper arm 40L, so that both stopper arms 40L and 40R are kept stationary. This causes the 8 cm compact disc 24S transferred by the transfer roller 22 to be deviated toward the center of the disc loading structure, as shown in FIGS. 6C to 6D.

Figure 6E:
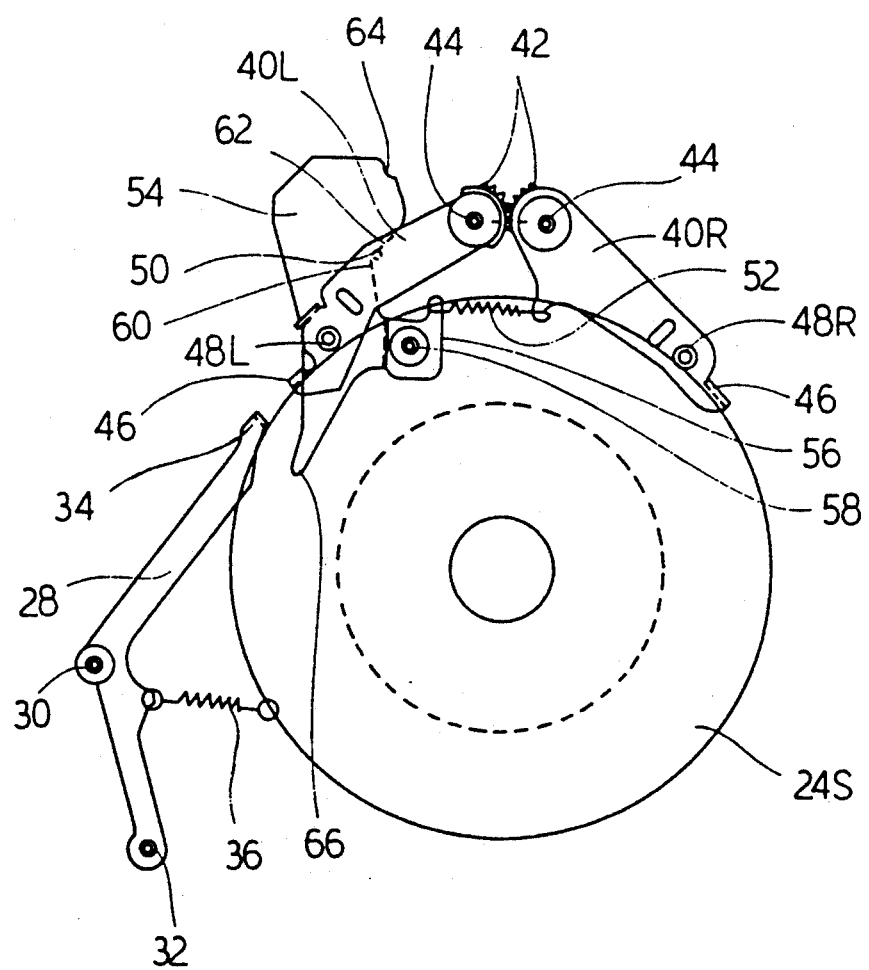

Thereafter, the 8 cm compact disc 24S, as shown in FIG. 6E, is substantially centrally positioned by means of the stopper arms 40L and 40R, so that the center of the disc 24S may be substantially aligned with that of the turntable 20. At this time, any detection means detects the completion of insertion of the disc, followed by the next procedure.

When the insertion of the 8 cm compact disc is started at substantially the central portion of the disc insertion port or on the right side thereof, the outer periphery of the disc fails in abutment against the sensor pin 32 of the sensor link 28. Thus, the lock arm 54 is not pivotally moved, to thereby cause the pivotal movement of the stopper arm 40L to be kept locked. This results in the stopper arm 40R connected through the gears 42 to the arm 40L being likewise kept locked. Thus, when the insertion of the 8 cm compact disc 24S is started on the right side of the disc insertion port, it is abuttedly guided by the abutment 46 and stopper pin 48R of the right-side stopper arm 40R, to thereby be moved toward the center of the disc loading structure; whereas, when the disc 24S is inserted at the substantially central portion of the disc insertion port, it is transferred while being abutted against the stopper pins 48L and 48R and then moved to the substantially central region of the disc loading structure by the stopper arms 40L and 40R, as shown in FIG. 6E.

Now, the manner of loading of a 12 cm compact disc will be described hereinafter with reference to FIGS. 7A to 7E.

Figure 7A:
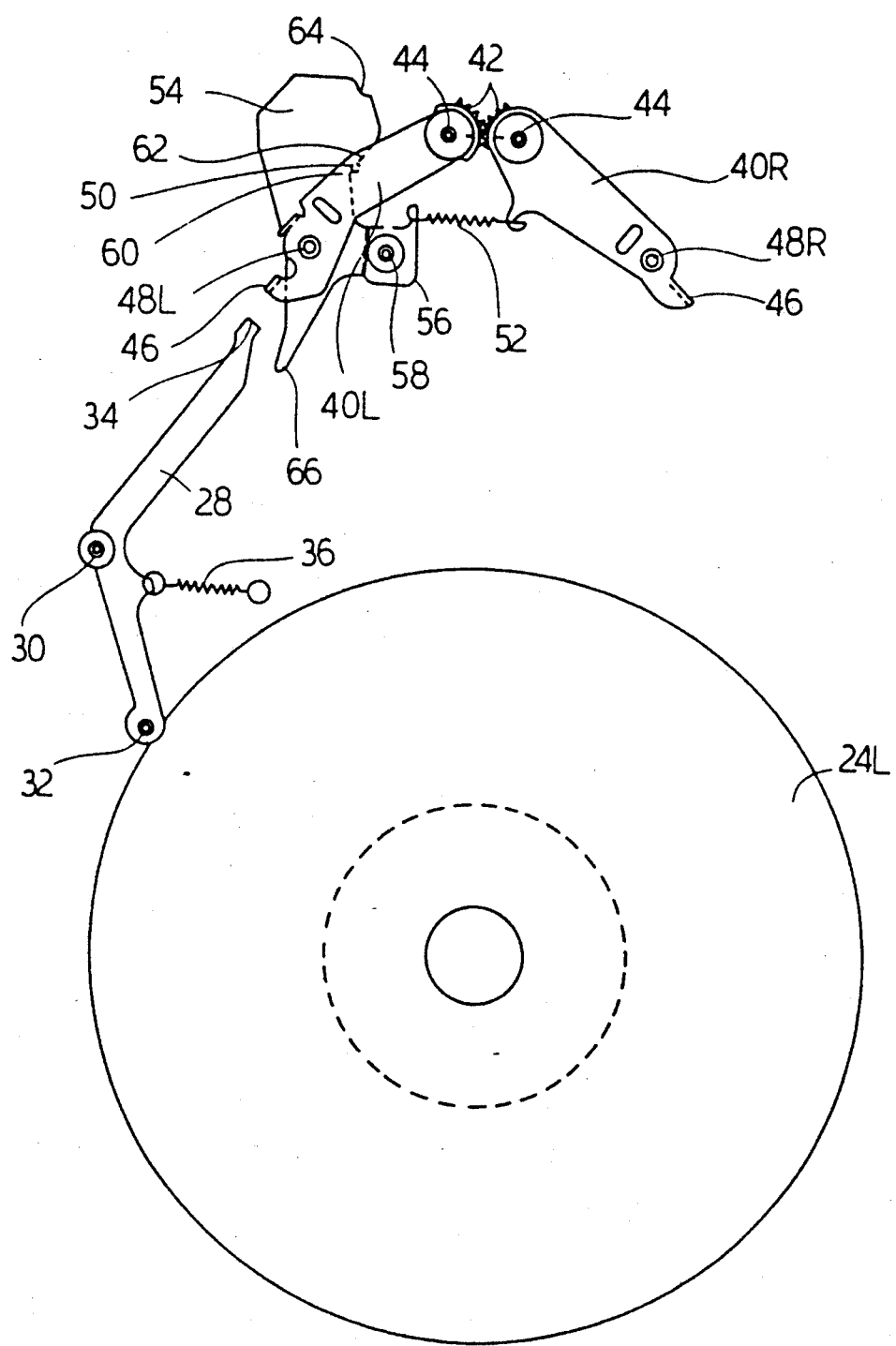
Figure 7B:
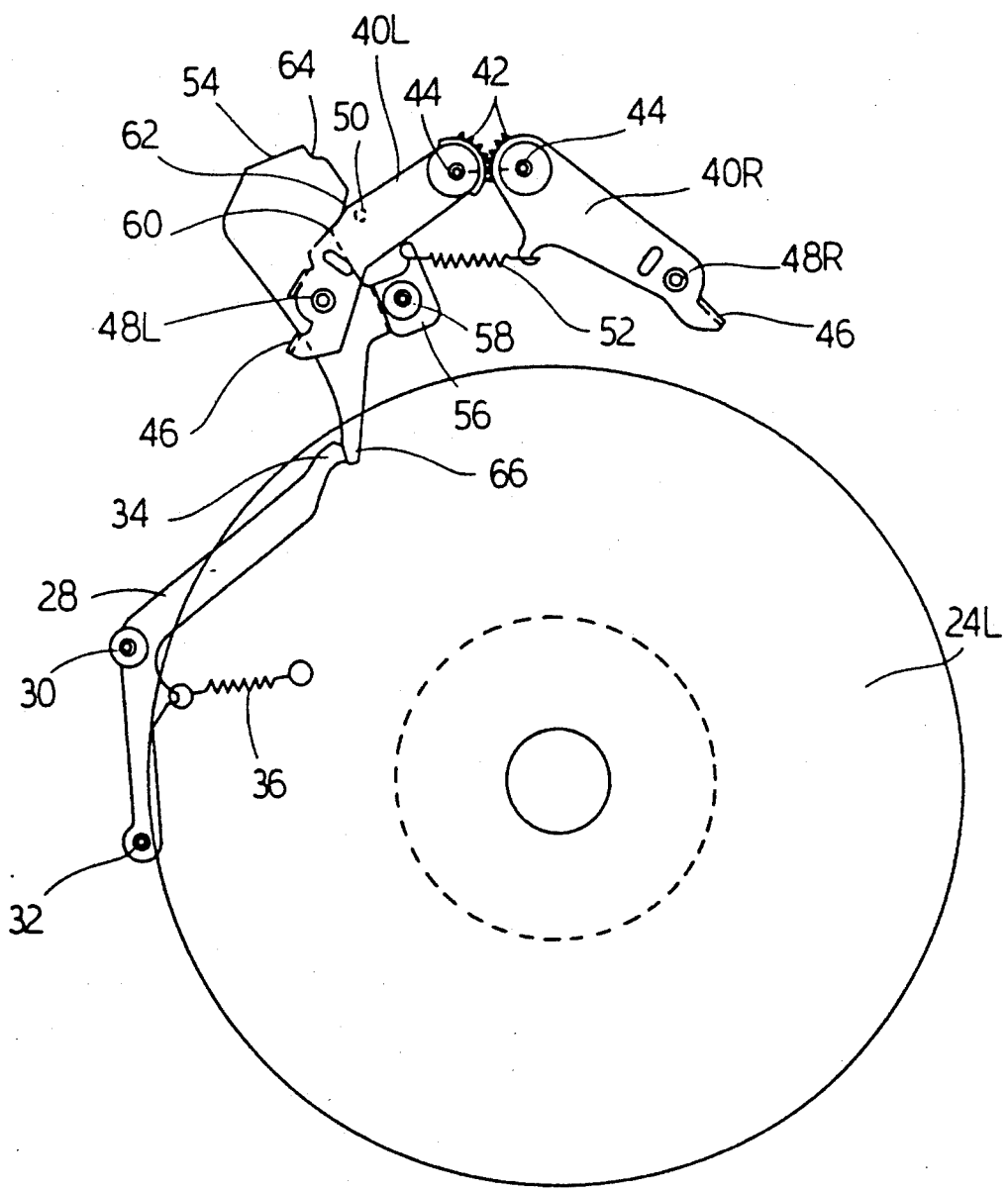
Figure 7C:
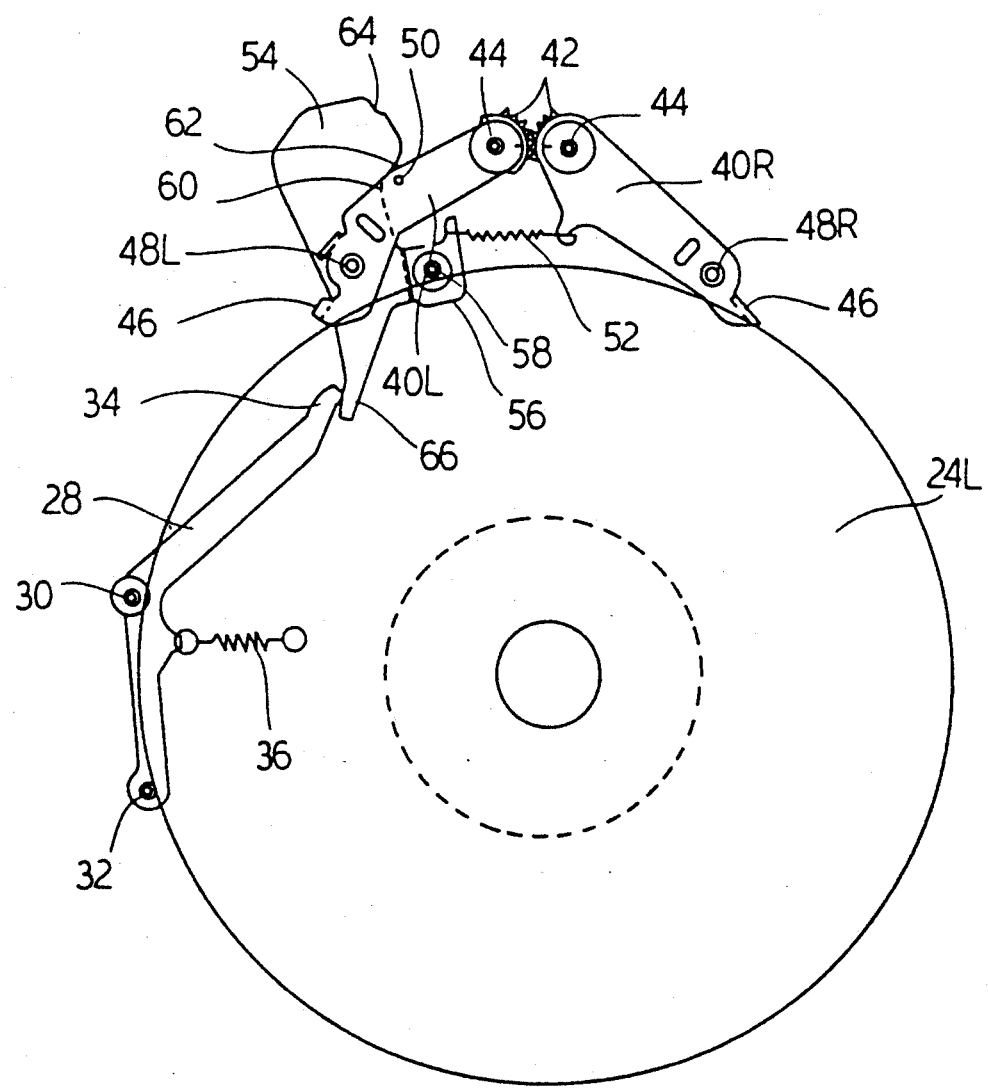

The transfer roller 22 is actuated by a loading start command as in the 8 cm compact disc loading described above. This leads to transferring of a 12 cm compact disc 24L, to thereby cause the outer periphery of the disc 24L to be abutted against the sensor pin 32 as shown in FIG. 7A. Thus, the sensor link 28 is pivotally moved in the clockwise direction along the periphery of the 12 cm compact disc 24L, as shown in FIG. 7B, so that the engagement pin 50 is released from the rear lock 60 to accomplish releasing of the stopper arm 40L from the positional regulation. When the 12 cm compact disc 24L is further transferred or advanced to cause the maximum diameter of the disc to reach the sensor pin 32, the sensor link 28 is pivotally moved again in the counterclockwise direction due to the urging force of the sensor link spring 36 because the outer periphery of the disc is inwardly curved, so that the lock arm 54 is released from the sensor link. This causes the lock arm spring 52 to pivotally move the lock arm 54 toward the original position in the clockwise direction. At this time, the distance of transfer of the 12 cm compact disc 24L is larger than that of the 8 cm compact disc 24S, so that a timing of return of the lock arm 54 is correspondingly delayed, during which the outer peripheral edge of the 12 cm compact disc 24L is abutted against the abutments 46 and stopper pins 48L and 48R of the stopper arms 40L and 40R. Thus, the forward movement of the disc 24L causes the stopper arms 40L and 40R to be forward pivotally moved before the engagement pin 50 is abutted against the rear lock 60 of the lock arm 54 to carry out the positional regulation of the stopper arm 40L. Therefore, even when the lock arm 54 is abutted against the stopper arm 40L due to the pivotal movement in the clockwise direction, the engagement pin 50 is located at the rear end portion of the guide or slope 62 rather than the rear lock 60, so that the stopper arms 40L and 40R are movable without being subject to any positional regulation. Thus, the movement of the 12 cm compact disc is transmitted to the stopper arms 40L and 40R, leading to movement of the engagement pin 50 along the guide 62 and forward pivotal movement of the stopper arms 40L and 40R as shown in FIGS. 7C and 7D.

Figure 7E:
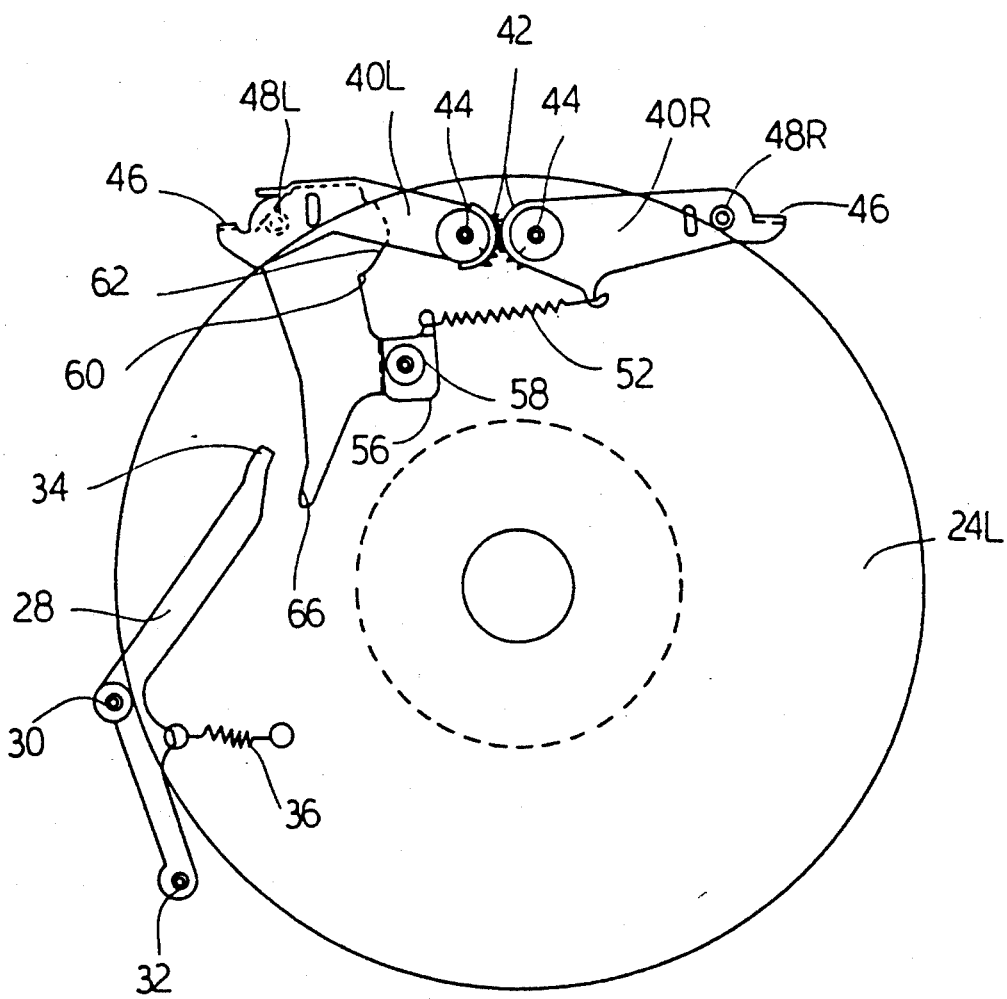

When the 12 cm compact disc 24L is further transferred or advanced, the engagement pin 50 is held at the front lock 64 to carry out the positional regulation of the stopper arms 40L and 40R, as shown in FIG. 7E. Thus, the insertion of the 12 cm compact disc is completed. This may be detected by any conventional detecting means, followed by the next procedure.

Now, the manner of unloading of a disc from the disc loading structure will be described hereinafter with reference to FIGS. 8A to 8E.

The disc unloading operation is carried out by rotating the transfer roller 22 in the opposite direction. When a disc ejecting command is generated based on operator's instructions, the disc loading structure takes a predetermined disc ejecting mode, so that the transfer roller 22 is rotated in the direction opposite to that in the disc loading operation.

Figure 8A:
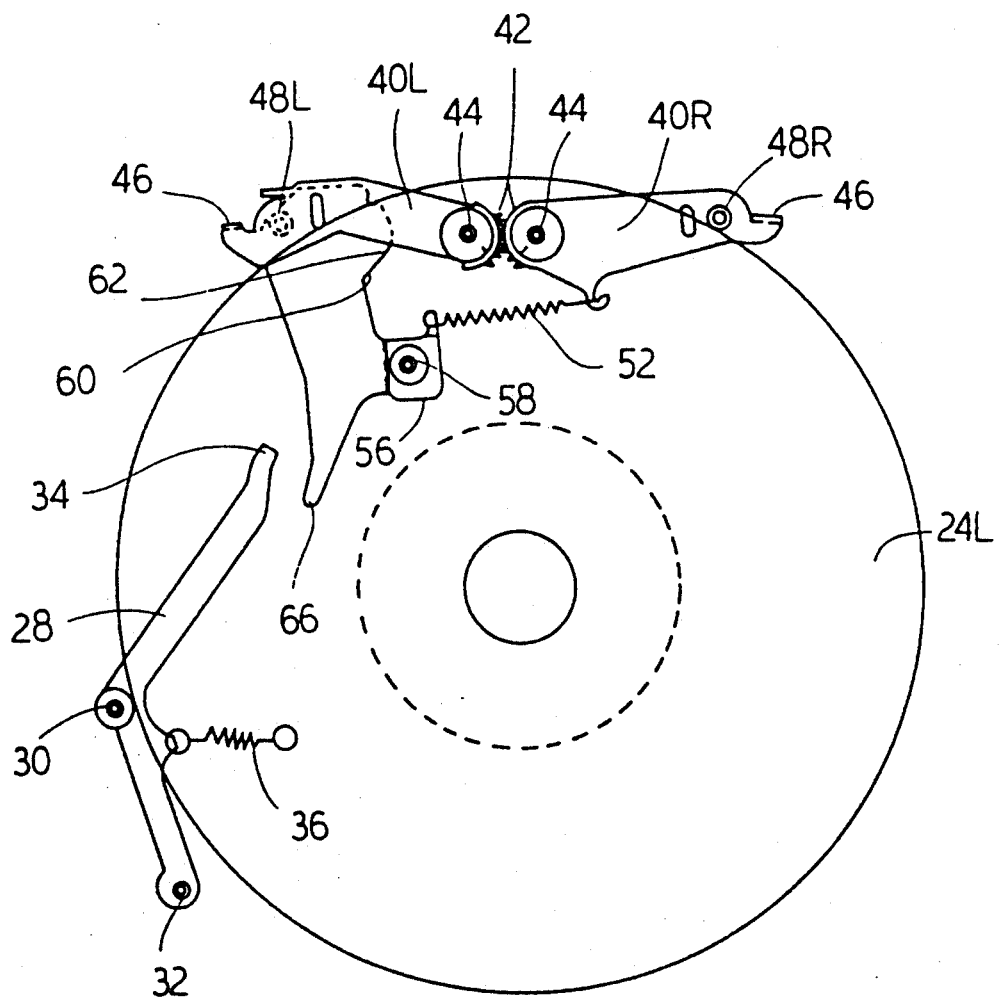
FIG. 8A to 8E each are a plan view of the manner of ejection of a 12 cm compact disc.
Figure 8B:
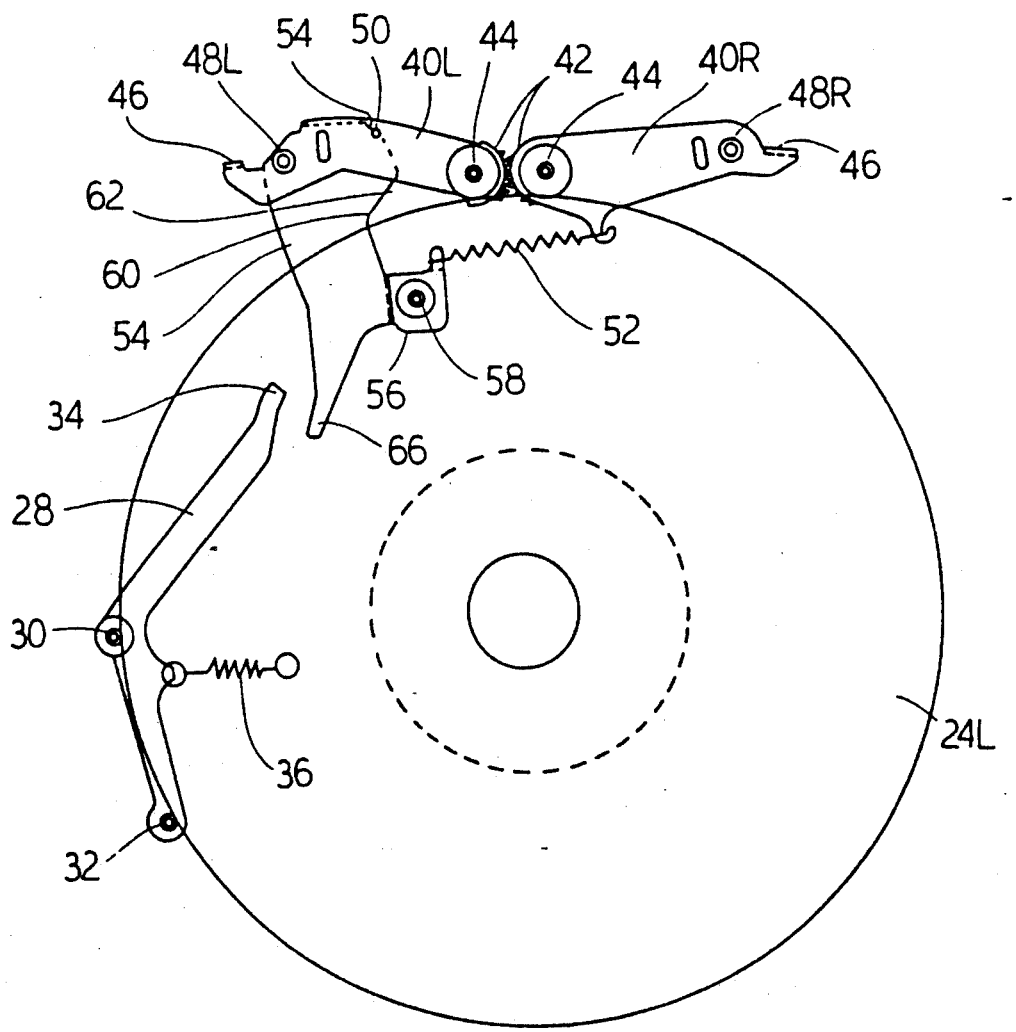
Figure 8C:
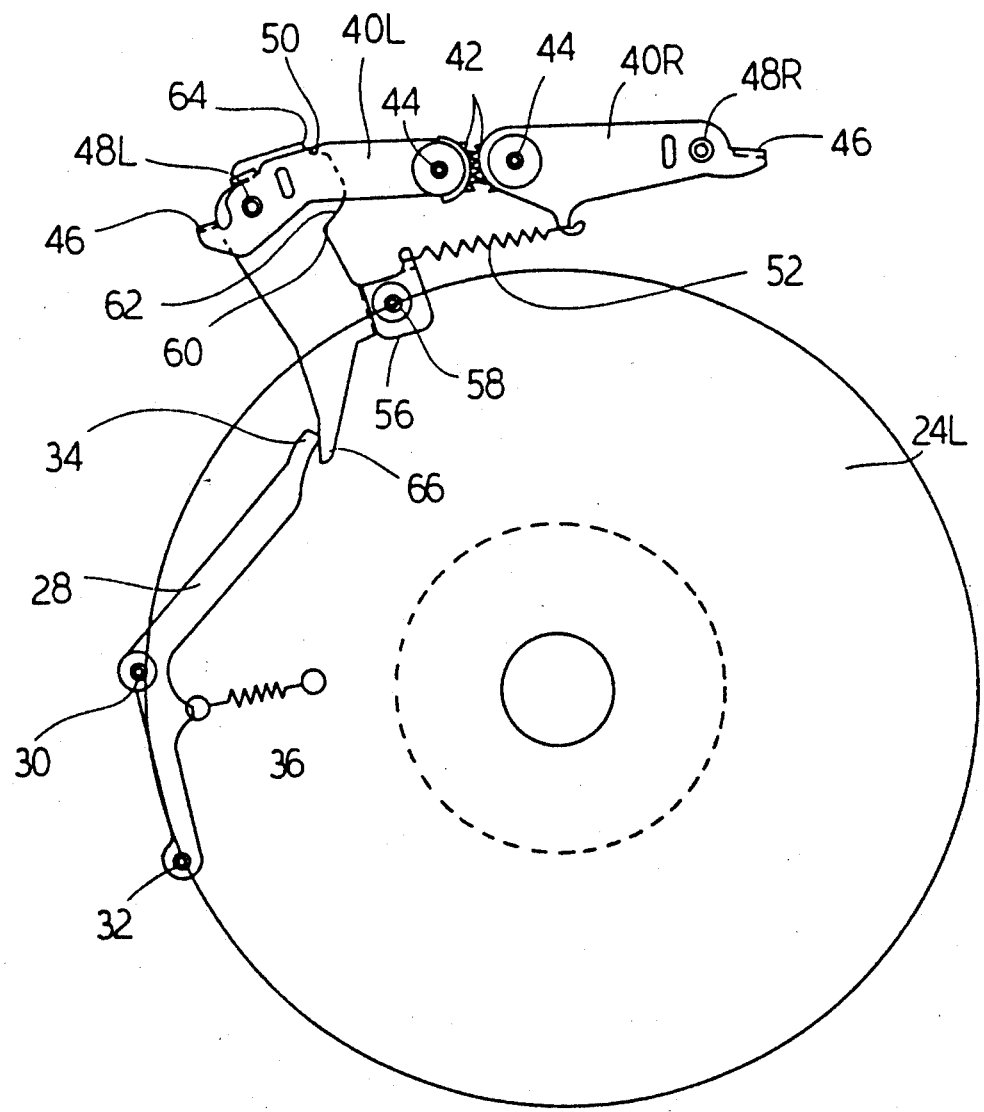
Figure 8D:
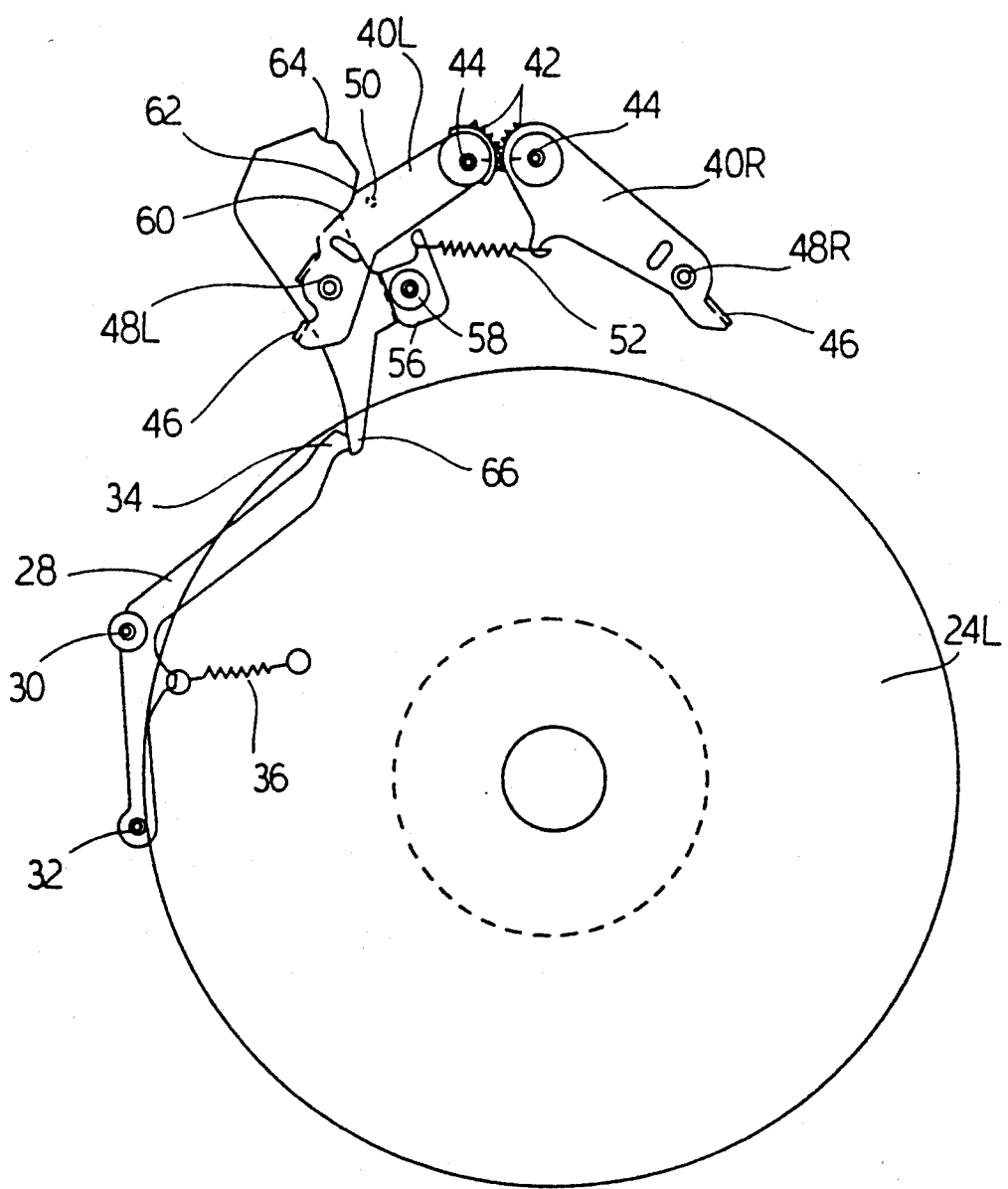
Figure 8E:
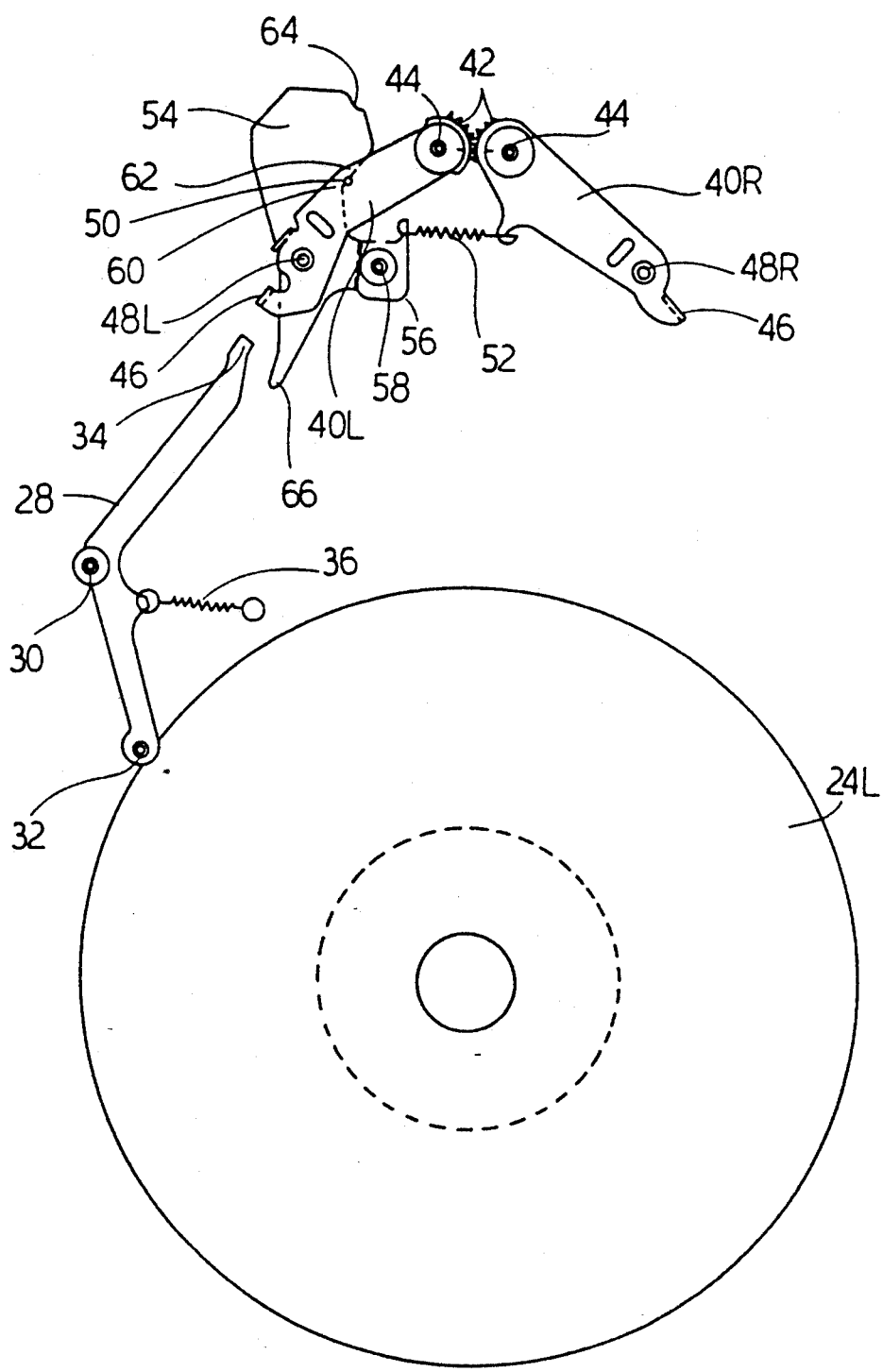

In the operation of ejecting a 12 cm compact disc 24L from the disc loading structure, the outer periphery of the 12 cm compact disc 24L is rearward abutted against the sensor pin 32 from the inside of the pin, leading to pivotal movement of the sensor link 28 in the clockwise direction as shown in FIGS. 8A and 8B. Then, when the pivotal movement of the sensor link 28 is carried out by a predetermined angle, the pawl 34 of the sensor link 28 forces the pawl 66 of the lock arm 54 as in the disc loading operation. This causes the lock arm 54 to be pivotally moved in the counter-clockwise direction, so that the engagement pin 50 is released from engagement with the front lock 64. Then, the elastic force of the lock arm spring 52 causes the stopper arm 40L to be inward moved, to thereby inward move the stopper arm 40R connected thereto through the gears 42, so that the stopper arms 40L and 40R each are returned to the initial position, as shown in FIGS. 8C and 8D. Then, as shown in FIG. 8D, the pawl 34 of the sensor link 28 is released from the pawl 66 of the lock arm 54 before the disc unloading or ejecting operation is completed, so that the regulation of pivotal movement of the lock arm 54 by the sensor link 28 is released. This results in the lock arm 54 being likewise returned to the initial position due to the elastic force of the lock arm spring 52.

Thus, the disc loading structure of the illustrated embodiment permits each of the stopper arms 40L and 40R and lock arm 54 to be positively returned to the initial position whenever the disc unloading operation is completed, to thereby be ready for loading of any one of an 8 cm compact disc and a 12 cm compact disc.

As described above, the illustrated embodiment is so constructed that the mechanical disc discriminating means comprising the sensor link permits the 12 cm and 8 cm compact discs to be automatically selectively positioned on the turntable, resulting in eliminating a necessity of using any exclusive adapter and preventing power consumption during the disc loading operation. Also, in the illustrated embodiment, the locking of the stopper arms 40L and 40R at the 12 cm CD and 8 cm CD positions is carried out by means of the single lock arm 54, to thereby reduce the manufacturing cost. Further, the disc loading structure of the illustrated embodiment permits each of the stopper arms 40L and 40R and lock arm 54 to be automatically returned to the initial or original position when the disc unloading operation is completed, leading to simplification of the construction and a significant decrease in the number of parts.

In the illustrated embodiment, the lock member or lock arm and the large-diameter disc regulating means may be provided separate from each other. Also, the components such as the sensor link, stopper arms and the like may be varied in configuration and dimensions as desired. The positional regulation of the 12 cm compact disc may be carried out by abutting the stopper arms against the stage plate in place of providing the lock for the 12 cm compact disc at the lock arm. Further, it will be noted that the illustrated embodiment is applicable to any disc player in which two or more disc different in size are handled, other than a compact disc player.

Referring now to FIGS. 9 to 12 showing another embodiment of a disc loading structure according to the present invention, a disc loading structure of the illustrated embodiment is applied to a compact disc player which includes a chassis 68 and a sub-chassis 70 arranged forward of the chassis 68, on both of which components for the compact disc player are mounted. A transfer roller 22 is arranged on the rear portion of the chassis 68 and a turntable 20 is arranged on the central portion of the chassis 68. Also, the disc loading structure of the illustrated embodiment includes a trigger plate 72 arranged on the front portion of the right side edge of the chassis 68. The trigger plate 72 is formed at the front and rear ends thereof with front and rear projections 74a and 74b inward projecting therefrom. The front projection 74a is projected by a small distance and the rear projection 74b is formed into a plate-like shape and so as to project from the upper edge of the trigger plate 72. The rear projection 74b is formed with an L-shaped aperture 76. Also, the rear projection 74b is formed at the distal end thereof into a first abutment 78 which is forced against an 8 cm compact disc detecting plate 80 described hereinafter, whereas the front projection 74a is formed at the distal end thereof into a second abutment 82 which is forced against a 12 cm compact disc detection plate 84 described hereinafter. The trigger plate 72 is provided with a trigger plate spring 86, which acts to constantly urge the trigger plate 72 in the forward direction. In the aperture 76 of the trigger plate 72 is engagedly fitted a holding pin 88, which serves to regulate the forward movement of the trigger plate 72. With the trigger plate 72 is engaged a holding pin 90, which serves to regulate the forward and rearward movement of the trigger plate 72.

The chassis 68 is provided on the right side edge thereof with a drive gear 92 and a rotatable intermittent gear 94. The drive gear 92 is driven by a drive motor (not shown) and includes a gear section 96. The intermittent gear 94 includes gear sections 98 and 100 which partially lack teeth. Reference numeral 102 designates a rack plate, which is supported so as to be slidable in the forward and rearward directions and provided at the upper end thereof with a rack gear 104. The tooth portion of the gear section 100 is engaged with the gear section 96 and the tooth portion of the gear section 98 is engaged with the rack gear 104. The trigger plate 72 is provided at the rear end thereof with an engagement pin 106 and the gear section 100 of the intermittent gear 94 is provided with a guide rail 108, which is engaged with the engagement pin 106, so that the sliding of the trigger plate in the forward and rearward directions causes the intermittent gear 94 to be rotated in both directions.

Figure 10:
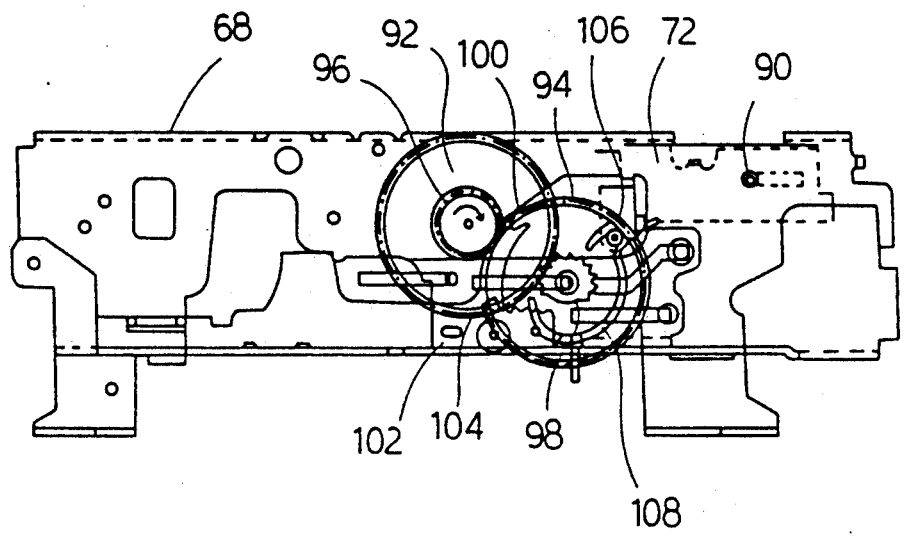
FIG. 10 is a fragmentary side elevation view showing an essential part of the disc loading structure of FIG. 9 wherein an intermittent gear is released from the engagement with a rack plate.

In FIG. 10, the trigger plate 72 is moved to the foremost position, and the tooth-free portion of the gear section 100 of the intermittent gear 94 is opposite to the gear section 96 and the tooth-free portion of the gear section 98 is opposite to the rack gear 104. At this time, rotation of the drive gear 92 does not lead to movement of the rack plate 102. When the trigger plate 72 is moved in the rearward direction or in the left direction in FIG. 10, the engagement pin 106 is moved in the rearward direction to force the guide rail 108, to thereby cause the intermittent gear 94 to be rotated, so that the tooth portions of the gear sections 98 and 100 are engaged with the gear section 96 and rack gear 104. Thus, rotation of the drive gear 92 in the clockwise direction causes the rack plate 102 to be forward moved through the gear sections 96, 100 and 98 and rack plate 102, resulting in a compact disc being clamped through a clamp mechanism described hereinafter.

Figure 11:
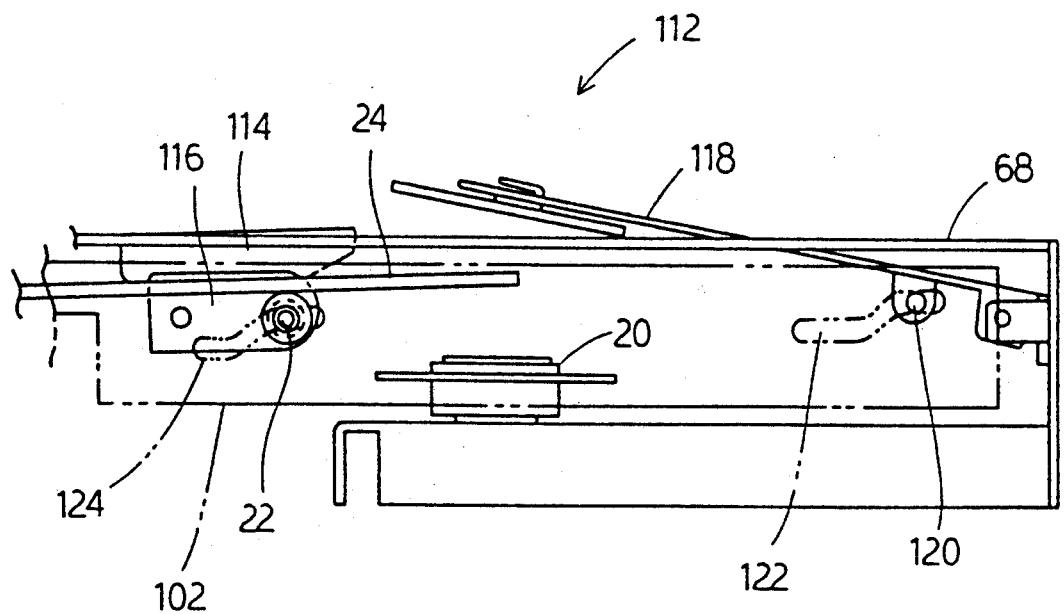
FIG. 11 is a fragmentary side elevation view showing a clamping mechanism incorporated in the disc loading structure of FIG. 9.
Figure 12:
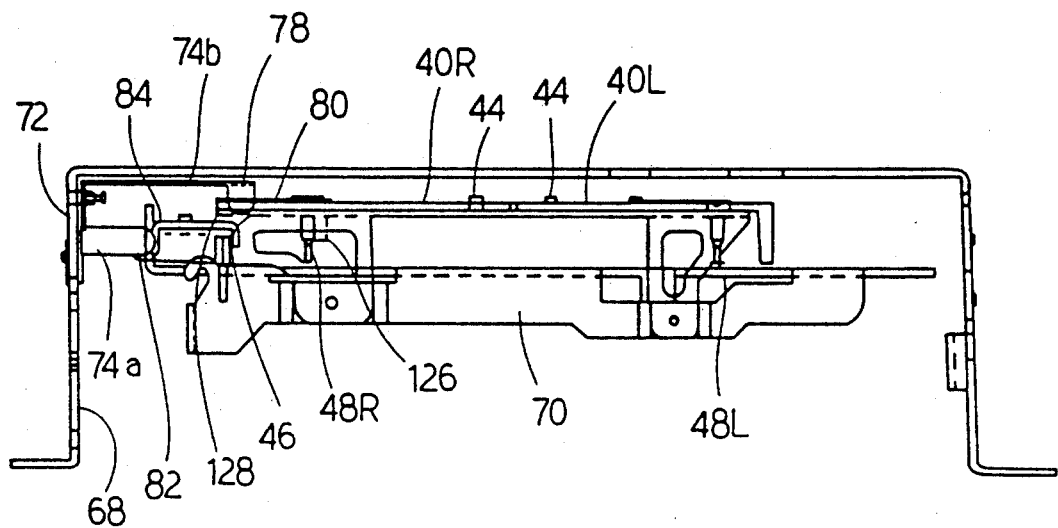
FIG. 12 is a rear view of the disc loading structure shown in FIG. 9.

Now, a clamp mechanism will be described with reference to FIG. 11.

A clamp mechanism generally designated at reference numeral 112 includes an upper guide plate 114 fixed on the chassis 68 on which the rack plate 102 described above is slidably supported. The upper guide plate 114 serves to downward hold a compact disc 24 being transferred. Also, the clamp mechanism 112 includes a lower guide plate 116 arranged below the upper guide plate 114 in a manner to be vertically pivotally movable. The lower guide plate 116 is provided with the above-described transfer roller 22. Also, the clamp mechanism 112 includes a clamp arm 118 pivotally provided on the chassis 68 so that the compact disc 24 transferred to a predetermined position above the turntable 20 is clamped on the turntable 20. The pivotal movement of the clamp arm 118 is carried out through the vertical displacement of a pin 120 of the clamp arm 118 in an elongated aperture 122 formed at the rack plate 102 due to the movement of the rack plate 102. In the clamp mechanism 112 constructed as described above, the compact disc 24 inserted through the disc insertion port (not shown) is transferred to the turntable 20 by the transfer roller 22 while being interposedly supported between the upper guide plate 114 and the lower guide plate 116. Then, when the disc is transferred to the predetermined position above the turntable 20, the rack plate 102 is forward moved to cause the clamp arm 118 to downward push the compact disc 24, to thereby clamp or mount the disc on the turntable. At this time, the lower guide plate 116 is downward pivotally moved through a deformed aperture 124 so that the transfer roller does not prevent the lowering of the disc onto the turntable.

In addition, the disc loading structure of the illustrated embodiment includes a pair of stopper arms 40L and 40R each supported through a support shaft 44 on the sub-chassis 70 and a lock arm 54 pivotally arranged on the sub-chassis 70 through a support shaft 58 in a manner to be in proximity to the left-side stopper arm 40L.

The 8 cm compact disc detection plate 80 briefly described above is pivotally supported on a stopper pin 48R. More particularly, the detection plate 80 is formed at the inner end thereof or the left-side end thereof in FIG. 9 with a holder 126 and at the outer end thereof or the right-side end thereof in FIG. 9 with a presser 128. Between the holder 126 and a projection pin 127 of the stopper arm 40R is arranged a reverse spring 130, which acts to urge the 8 cm compact disc detection plate 80 in the clockwise direction in FIG. 9. Also, the holder 126 is arranged so as to be abutted against the outer periphery or edge of the compact disc and the presser 128 is arranged so as to force the first abutment 78 of the trigger plate 72.

Figure 9:
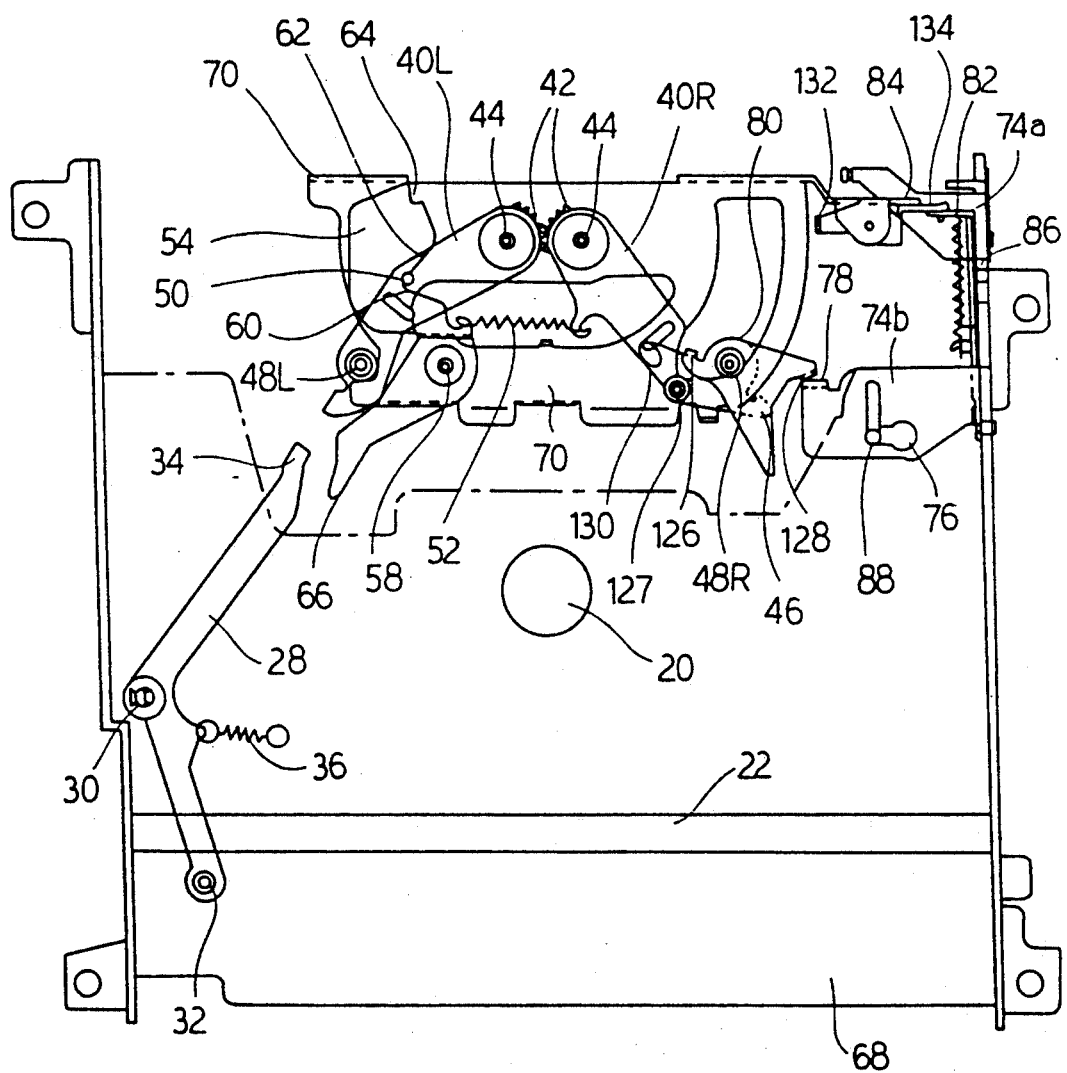
FIG. 9 is a plan view showing another embodiment of a disc loading structure according to the present invention.

The 12 cm compact disc detection plate 84 is provided at the inner end thereof or the left-side end thereof in FIG. 9 with an abutment 132 forced against an abutment 46 formed at the distal end of the stopper arm 40R. Also, the detection plate 84 is provided at the outer end thereof or the left-side end thereof in FIG. 9 with a presser 134, which is adapted to be constantly abutted against the second abutment 82 of the trigger plate 72 in the rearward direction.

In the illustrated embodiment constructed as described above, on the sub-chassis, the 8 cm compact disc detection plate 80, the stopper arms 40L and 40R and the 12 cm compact disc detection plate 84 which are arranged on the sub-chassis 70 are positioned in this order in the downward direction. The trigger plate 72 is so arranged on the chassis 68 that the projection 74a is at the same level as the 12 cm compact disc detection plate 84 and the projection 74b is above the 8 cm compact disc detection plate 80.

The remaining part of the illustrated embodiment may be constructed in substantially the same manner as the embodiment described above with reference to FIGS. 3 to 5.

Now, the manner of operation of the illustrated embodiment will be described hereinafter with reference to FIGS. 13 to 16.

Figure 13:
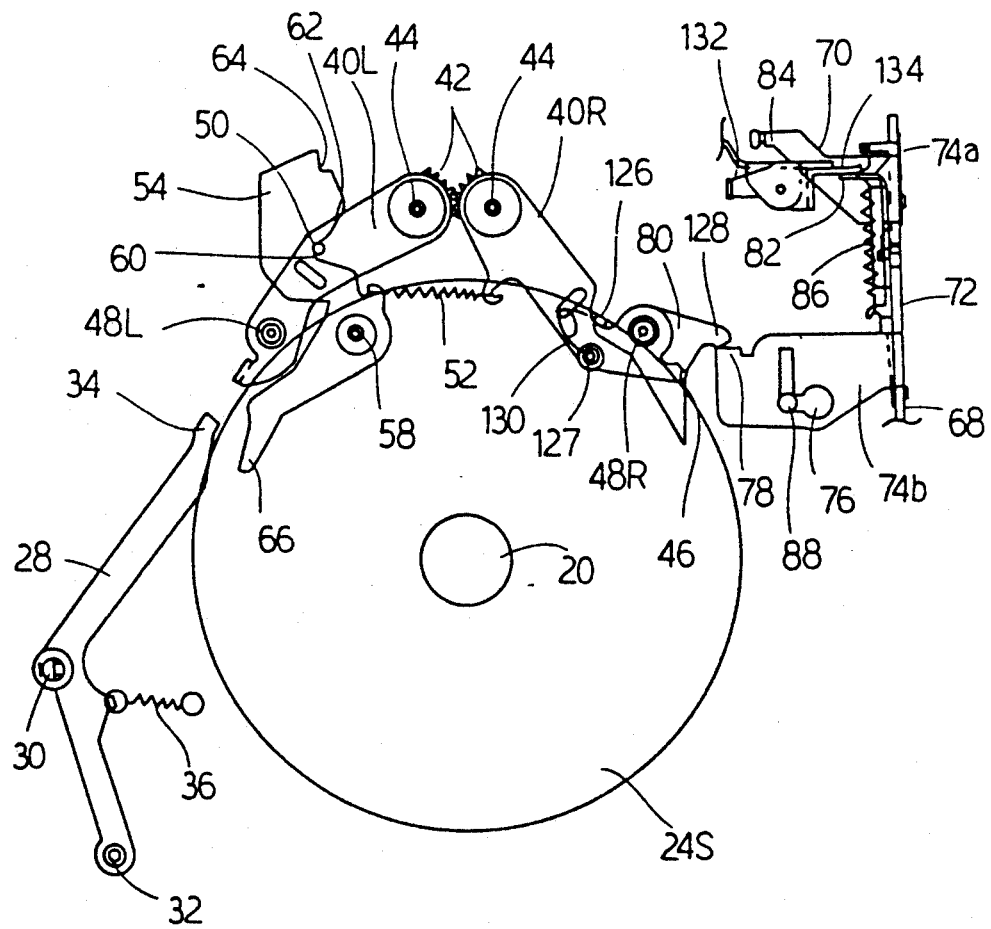
Figure 15:
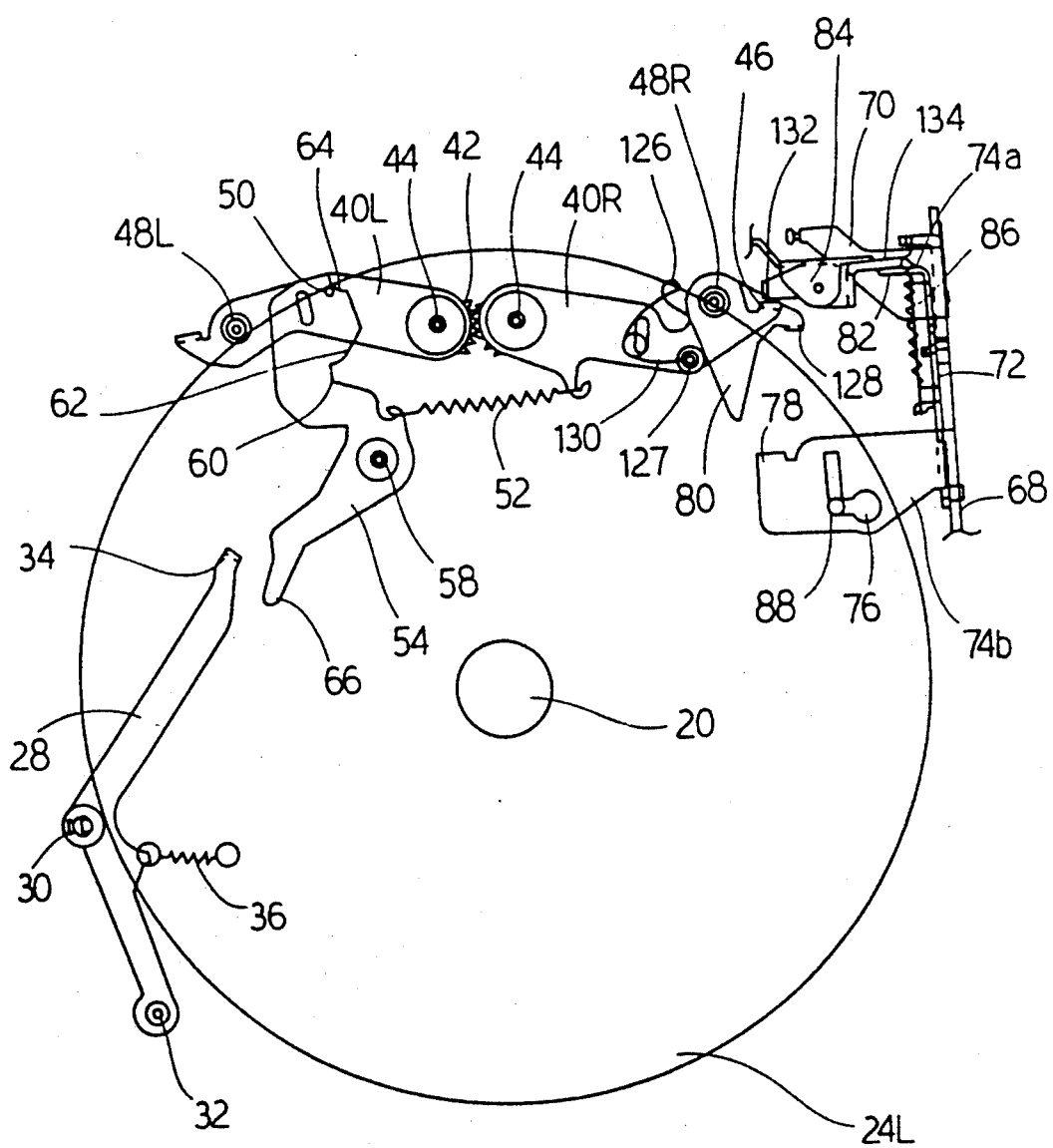
FIGS. 15 and 16 each are a plan view showing the manner of loading of a 12 cm compact disc.

First, the operation of loading of an 8 cm compact disc will be described. When an 8 cm compact disc 24S is transferred without being abutted against a sensor pin 32, a sensor link 28 and a lock arm 54 are not pivotally moved, so that an engagement pin 50 is kept engaged with a rear lock 60. When the 8 cm compact disc 24S is transferred while being abutted against the sensor pin 32, to thereby pivotally move the sensor link 28 and lock arm 54, the engagement pin 50 is released from the rear lock 60 once. However, the 8 cm compact disc is small in width, therefore, the sensor link spring 36 and lock arm spring 52 cause each of the sensor link 28 and lock arm 54 to be returned to the original position before the 8 cm compact disc is contacted with the stopper arm 40L. Thus, as shown in FIG. 13, the lock arm 54 prevents pivotal movement of the stopper arm 40L whenever the 8 cm compact disc 24S is inserted in the disc loading structure of the illustrated embodiment, resulting in the stopper arm 40L being held at a rearward position. This also causes the stopper arm 40R to be held at a rearward position.

Then, when the outer periphery or edge of the 8 cm compact disc 24S is abutted against the stopper pins 48L and 48R, the 8 cm compact disc detection plate 80 is pivotally moved in the clockwise direction because the edge of the 8 cm compact disc forces the holder 126 of the detection plate 80, as shown in FIG. 14. This causes the presser 128 to force the first abutment 78 of the trigger plate 72, resulting in the trigger plate 72 being moved in the rearward direction or the downward direction in FIG. 14. Thus, the intermittent gear 94 engaged through the engagement pin 106 with the trigger plate 72, as shown in FIG. 8, is rotated in the counterclockwise direction. The rotation of the intermittent gear 94 causes the gear sections 98 and 100 to be engaged with the rack gear 104 of the rack plate 102 and the gear section 96 of the drive gear 92, respectively, so that the drive force of the drive gear 92 is transmitted through the intermittent gear to the rack gear 104, leading to forward movement of the rack plate 102. This results in the 8 cm compact disc being clamped.

Now, the manner of loading of a 12 cm compact disc L will be described. When a 12 cm compact disc 24L is inserted in the disc loading structure of the illustrated embodiment as shown in FIG. 6, the compact disc forces the sensor pin 32 to pivotally move the sensor link 28 and lock arm 54 in the counterclockwise direction. This causes the engagement pin 50 to be released from the rear lock 60, to thereby unlock the stopper arm 40L. Thus, the stopper arms 40L and 40R are rendered pivotally movable and then forward moved by the 12 cm compact disc 24L being transferred, during which the engagement pin 50 is engaged with a front lock 64 of the lock arm 11. This results in the stopper arm 40L being held at a forward position, to thereby cause the stopper arm 40R to be held at a forward position.

Figure 16:
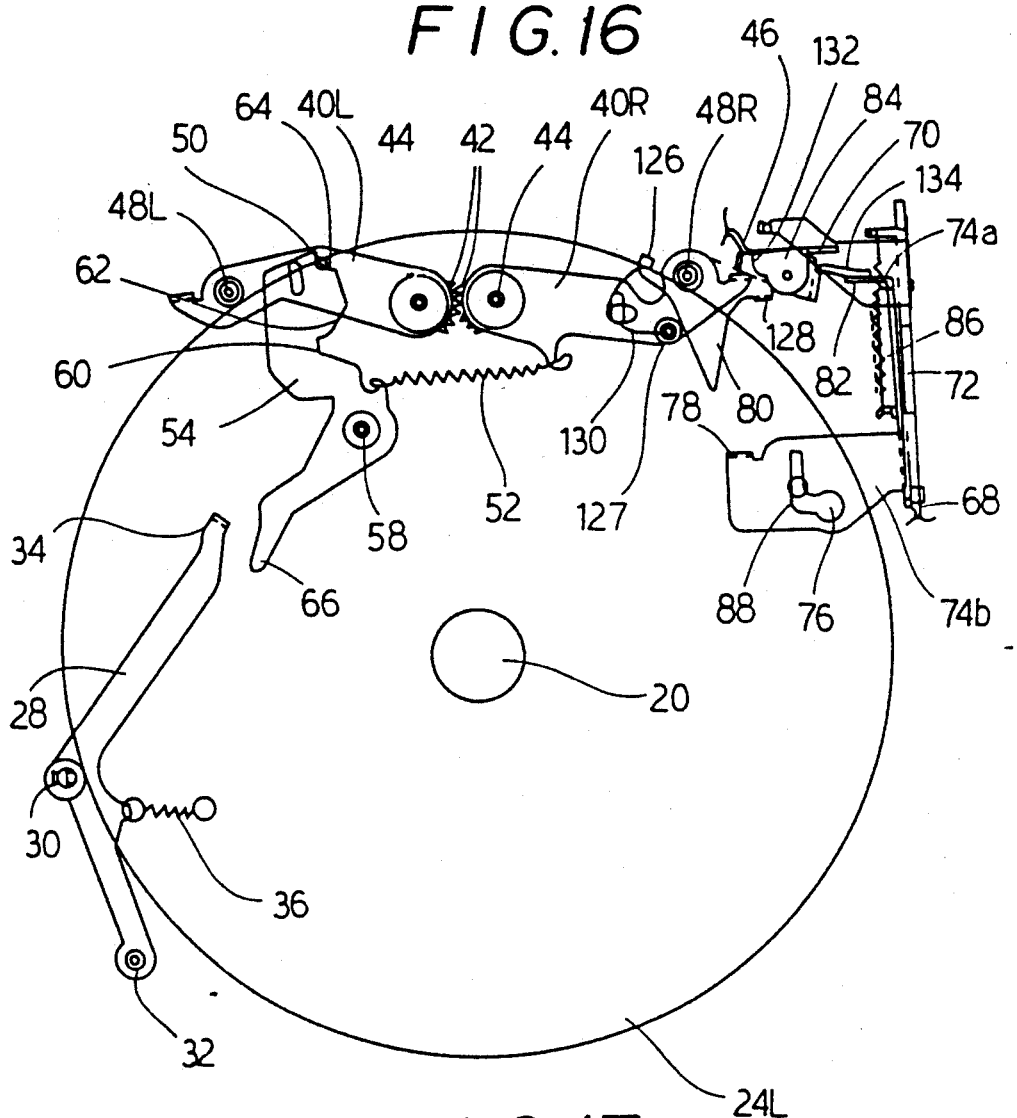
Figure 17:
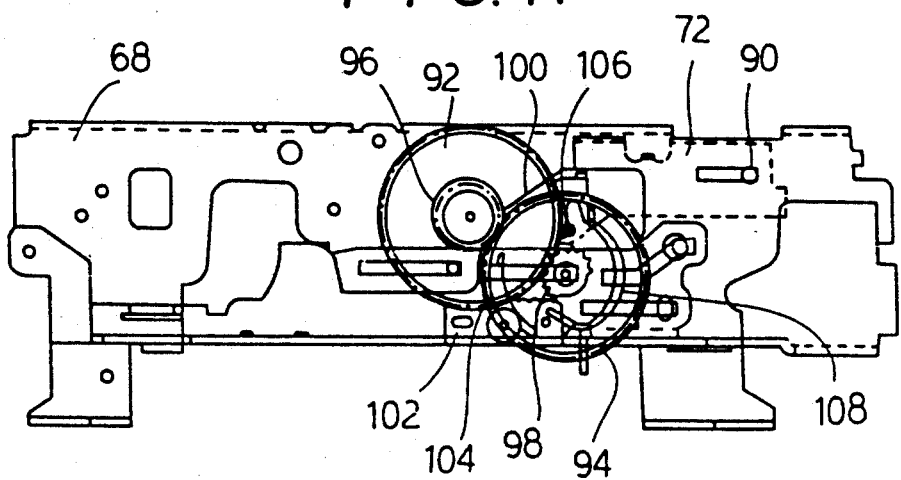
FIG. 17 is a fragmentary side elevation view similar to FIG. 10 wherein an intermittent gear is engaged with the engagement with a rack plate.

Subsequently, the abutment 46 of the stopper arm 40R pivotally moved as shown in FIG. 16 forces the abutment 132 of the 12 cm compact disc detection plate 84, so that it is pivotally moved in the clockwise direction in FIG. 16, leading to forward movement of the trigger plate 72. This causes the intermittent gear 94 engaged through the engagement pin 50 with the trigger plate 72 to be rotated in the counterclockwise direction, so that the gear sections 98 and 100 are engaged with rack gear 104 and the gear section 96 of the drive gear 92, respectively. This results in the drive force of the drive gear 92 being transmitted through the intermittent gear 94 to the rack gear 104, leading to forward movement of the rack plate 102. This results in the 12 cm compact disc 24L being clamped.

Thus, it will be noted that the illustrated embodiment accurately detects the completion of insertion of each of two or more compact disc different in size into a predetermined position to positively transmit power required for the disc clamping operation. Also, it substantially reduces power consumption during the disc transferring and clamping operation.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc loading mechanism comprising:
   a single mechanical sensor link arm pivotally arranged so as to be pivotally movable to a pivot position due to engagement with a disc being transferred, said pivot position determined by the size of said disc;
   a pair of stopper arms pivotally arranged and operatively connected to each other so as to be pivotally moved in association with each other;
   said stopper arms each including a stopper against which the disc is abutted for determining positions of the disc;
   a single lock member pivotally arranged so as to be pivotally movable when contacted by said sensor link arm and operatively connected to one of said stopper arms;
   a large-diameter disc regulating means for holding said stopper arms in an open position;
   a small-diameter disc regulating means for holding said stopper arms in a closed position;
   said large-diameter disc regulating means and small-diameter disc regulating means being provided on said lock member, and locking of said stopper arms by said lock member being carried out through said large-diameter disc regulating means and small-diameter disc regulating means;
   a spring means for connecting said lock member and one of said stopper arms so as to hold said stopper arms in the closed position by said small-disc regulating means;
   said lock member moving said stopper arm from the closed position against the force of said spring means and locking said stopper arm in the open position, when said sensor link arm pivotally moves in response to an insertion of a large disc.

2. A disc loading mechanism comprising:
   a single mechanical sensor link arm pivotally arranged so as to be pivotally movable to a pivot position due to engagement with a disc being transferred, said pivot position determined by he size of said disc;
   a pair of stopper arms pivotally arranged and operatively connected to each other so as to be pivotally moved in association with each other;
   said stopper arms each including a stopper against which the disc is abutted;
   a single lock member pivotally arranged so as to be pivotally movable when contacted by said sensor link arm and operatively connected to one of said stopper arms;
   said lock member selectively locking said stopper arms through engagement with said one of said stopper arms depending upon the pivot position of said sensor link arm, said stopper arms being locked in an open position when said sensor link arm pivotally moves in response to a large disc and a closed position when said sensor link arm pivotally moves in resonances to contact with a small disc;
   a large-diameter disc regulating means for holding said stopper arms in said open position; and
   a small-diameter disc regulating means for holding said stopper arms in said closed position;
   said large-diameter disc regulating means and small-diameter disc regulating means being provided on said lock member;
   said locking of said stopper arms by said lock member being carried out through said large-diameter disc regulating means and small-diameter disc regulating means.

3. The disc loading mechanism of claim 2, wherein said large-diameter disc regulating means comprises a recess formed on said lock member for engaging with said one of said stopper arms.

4. The disc loading mechanism of claim 2, wherein said small-diameter disc regulating means comprises a recess formed on said lock member for engaging with said one of said stopper arms.

* * * * *